US009529397B2

(12) United States Patent
Park

(10) Patent No.: US 9,529,397 B2
(45) Date of Patent: Dec. 27, 2016

(54) THERMAL MANAGEMENT OF AN ELECTRONIC DEVICE BASED ON SENSATION MODEL

(71) Applicant: QUALCOMM Incorporated, San Diego, CA (US)

(72) Inventor: Hee Jun Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 13/783,142

(22) Filed: Mar. 1, 2013

(65) Prior Publication Data

US 2014/0249690 A1      Sep. 4, 2014

(51) Int. Cl.
*G06F 1/32*      (2006.01)
*G06F 1/20*      (2006.01)

(52) U.S. Cl.
CPC ............. *G06F 1/206* (2013.01); *G06F 1/203* (2013.01); *G06F 1/3206* (2013.01); *G06F 1/324* (2013.01); *Y02B 60/1217* (2013.01)

(58) Field of Classification Search
CPC .......... G06F 1/206; G06F 1/203; G06F 1/324; G05D 23/1928
USPC .................................................. 700/300, 299
See application file for complete search history.

(56) References Cited

U.S. PATENT DOCUMENTS 4,697,430 A * 10/1987 Toyoda .............. G05D 23/1917
236/91 C
5,145,112 A * 9/1992 Ueda .................. B60H 1/00742
165/243
5,191,896 A * 3/1993 Gafni ..................... A61B 5/483
600/555

(Continued)

FOREIGN PATENT DOCUMENTS

TW     200846889 A    12/2008
TW     201011268 A    3/2010

OTHER PUBLICATIONS

"Adaptive Thermal Management of a Mobile Computer Based on External Tactile Thermal Sensory Data", IP.com Journal, IP.com Inc., West Henrietta, NY, US, Sep. 21, 2009 (Sep. 21, 2009), XP013134412, pp. 2, ISSN: 1533-0001 the whole document.

(Continued)

*Primary Examiner* — Kenneth M Lo
*Assistant Examiner* — Jason Lin
(74) *Attorney, Agent, or Firm* — Loza & Loza, LLP

(57) ABSTRACT

Some implementations provide a method for performing thermal management of an electronic device. The method determines a sensation value based on (i) a temperature of the electronic device, and (ii) a temperature rate change of the electronic device. The method associates a discomfort level from a plurality of discomfort levels, based on the determined sensation value, to the electronic device. At least one discomfort level is dynamically adjustable. The discomfort level specifies a maximum allowed activity for a pro- (Continued)

cessing unit of the electronic device. In some implementations, the discomfort level specifies how thermally uncomfortable the electronic device is for a user of the electronic device. In some implementations, each discomfort level from the several discomfort levels is associated with a particular range of sensation values. The sensation value is based on a user adjustable sensation model. The user adjustable sensation model is based on one of several thermal coefficient constants.

54 Claims, 13 Drawing Sheets

(56) References Cited

U.S. PATENT DOCUMENTS

| | | | | |
|---|---|---|---|---|
| 5,436,852 A | * | 7/1995 | Kon | 700/276 |
| 5,678,758 A | * | 10/1997 | Takegawa | G05D 23/1904 165/267 |
| 5,762,265 A | * | 6/1998 | Kitamura et al. | 236/51 |
| 5,996,084 A | | 11/1999 | Watts | |
| 6,349,269 B1 | | 2/2002 | Wallace, Jr. | |
| 7,630,856 B2 | | 12/2009 | Rockenfeller et al. | |
| 8,170,606 B2 | | 5/2012 | Dorsey et al. | |
| 8,195,970 B2 | | 6/2012 | Artman et al. | |
| 2003/0220721 A1 | * | 11/2003 | Cohen | 700/301 |
| 2006/0155424 A1 | * | 7/2006 | Katoh et al. | 700/300 |
| 2011/0301778 A1 | * | 12/2011 | Liang et al. | 700/299 |
| 2012/0049933 A1 | | 3/2012 | Riechel et al. | |
| 2012/0179303 A1 | | 7/2012 | Anderson et al. | |
| 2012/0229983 A1 | * | 9/2012 | Nakajima | H05K 7/20336 361/697 |

OTHER PUBLICATIONS

International Search Report and Written Opinion—PCT/US2014/017557—ISA/EPO—Apr. 24, 2014.
Taiwan Search Report—TW103106540—TIPO—Jun. 24, 2015.

* cited by examiner

THERMAL MANAGEMENT OF AN ELECTRONIC DEVICE BASED ON SENSATION MODEL

BACKGROUND

Field

Various features relate to a thermal management of an electronic device based on sensation model.

Background

Thermal management of electronic devices is an important factor in the design and operation of electronic devices. Thermal management is especially critical for portable handheld electronic devices (e.g., smart phones, tablets, wearable mobile device) because users holding/wearing the electronic devices are sensitive to the heat generated by the electronic devices. Traditionally, the thermal management of electronic devices relies on controlling the absolute temperature of the electronic devices. That is, an upper absolute temperature limit is specified for the electronic devices, and the thermal management controls the electronic device such that the electronic device is not allowed to operate and/or generate heat beyond the upper temperature limit. Thus, as long as the electronic device is operating below the upper absolute temperature limit, the thermal management will not limit, interfere or throttle the operation/activity of the electronic device. However, thermal management of an electronic device based solely on an upper temperature limit is inherently limited, and does not take into account other factors such as dynamic characterizations of human temperature sensation when performing thermal management.

Therefore, there is a need for an improved thermal management of portable and/or wearable electronic devices that take into account other factors and consideration when performing thermal management.

SUMMARY

Various features, apparatus and methods described herein provide a thermal management of an electronic device based on sensation model.

A first example provides a method for performing thermal management of an electronic device. The method determines a sensation value based on (i) a temperature of the electronic device, and (ii) a temperature rate change of the electronic device. The method associates based on the determined sensation value, a discomfort level from a plurality of discomfort levels to the electronic device. At least one discomfort level is dynamically adjustable. The discomfort level specifies a maximum allowed activity for a processing unit of the electronic device.

According to one aspect, the method includes determining whether an activity of the processing unit satisfies the maximum allowed activity for the processing unit. The method also includes changing the activity of the processing unit when the activity does not satisfy the maximum allowed activity for the processing unit. In some implementations, changing the activity includes reducing the activity of the processing unit.

According to an aspect, the method includes determining whether an activity of the processing unit satisfies the maximum allowed activity for the processing unit. The method also includes changing the activity of the processing unit until the activity does not satisfy the maximum allowed activity for the processing unit. In some implementations, changing the activity includes increasing the activity of the processing unit.

According to one aspect, the discomfort level specifies how thermally uncomfortable the electronic device is for a user of the electronic device. In some implementations, each discomfort level from the several discomfort levels is associated with a particular range of sensation values.

According to an aspect, the sensation value is based on a user adjustable sensation model. In some implementations, the user adjustable sensation model is based on one of several thermal coefficient constants.

According to one aspect, the temperature of the electronic device is the temperature of an exterior surface portion of the electronic device. The temperature rate change of the electronic device is the temperature rate change of the exterior surface portion of the electronic device.

According to an aspect, the temperature is an estimated temperature based on a processing unit temperature of the processing unit.

According to one aspect, the electronic device is incorporated into at least one of a music player, a video player, an entertainment unit, a navigation device, a communications device, a mobile device, a mobile phone, a smartphone, a personal digital assistant, a fixed location terminal, a tablet computer, a laptop computer and/or wearable mobile devices.

A second example provides an apparatus configured to perform thermal management of an electronic device. The apparatus includes a means for determining a sensation value based on (i) a temperature of the electronic device, and (ii) a temperature rate change of the electronic device. The apparatus also includes a means for associating based on the determined sensation value, a discomfort level from a plurality of discomfort levels to the electronic device, the discomfort level specifying a maximum allowed activity for a processing unit of the electronic device, at least one discomfort level being dynamically adjustable.

According to an aspect, the sensation value is based on an adjustable sensation model that includes a static sensation model and a dynamic sensation model. In some implementations, the adjustable sensation model is based on at least one thermal coefficient constant. In some implementations, at least one thermal coefficient constant is adjustable. The adjustable thermal coefficient constant specifies a range of temperature values for an adjustable discomfort level. In some implementations, the range of temperature values for the adjustable discomfort level includes a maximum temperature, where the maximum temperature is based on a minimum value of one of at least a sensation value, regulation limit, and/or manufacturer limit.

According to one aspect, the apparatus also includes a means for determining whether an activity of the processing unit satisfies the maximum allowed activity for the processing unit. The apparatus further includes a means for changing the activity of the processing unit when the activity does not satisfy the maximum allowed activity for the processing unit. In some implementations, the means for changing the activity includes means for reducing the activity of the processing unit.

According to an aspect, the apparatus also includes a means for determining whether an activity of the processing unit satisfies the maximum allowed activity for the processing unit. The apparatus further includes means for changing the activity of the processing unit until the activity does not satisfy the maximum allowed activity for the processing unit. In some implementations, the means for changing the activity includes means for increasing the activity of the processing unit.

According to one aspect, the temperature of the electronic device is the temperature of an exterior surface portion of the electronic device. The temperature rate change of the electronic device is the temperature rate change of the exterior surface portion of the electronic device.

According to one aspect, the temperature is an estimated temperature based on a processing unit temperature of the processing unit.

According to an aspect, the apparatus is incorporated into at least one of a music player, a video player, an entertainment unit, a navigation device, a communications device, a mobile device, a mobile phone, a smartphone, a personal digital assistant, a fixed location terminal, a tablet computer, a laptop computer, an eyeglass, a watch and/or wearable device.

A third example provides a computer readable storage medium that includes one or more instructions for performing thermal management of an electronic device, which when executed by at least one processor, causes the at least one processor to: determine a sensation value based on (i) a temperature of the electronic device, and (ii) a temperature rate change of the electronic device; and associate based on the determined sensation value, a discomfort level from a plurality of discomfort levels to the electronic device, the discomfort level specifying a maximum allowed activity for a processing unit of the electronic device, at least one discomfort level being dynamically adjustable.

According to an aspect, the sensation value is based on an adjustable sensation model that includes a static sensation model and a dynamic sensation model. In some implementations, the adjustable sensation model is based on at least one thermal coefficient constant. In some implementations, at least one thermal coefficient constant is adjustable. The adjustable thermal coefficient constant specifies a range of temperature values for an adjustable discomfort level. In some implementations, the range of temperature values for the adjustable discomfort level comprises a maximum temperature. The maximum temperature is based on a minimum value of one of at least a sensation value, regulation limit, and/or manufacturer limit.

According to one aspect, the computer readable storage medium further includes one or more instructions, which when executed by the at least one processor, causes the at least one processor to: determine whether an activity of the processing unit satisfies the maximum allowed activity for the processing unit; and change the activity of the processing unit when the activity does not satisfy the maximum allowed activity for the processing unit. In some implementations, the one or more instructions, which when executed by the at least one processor, causes the at least one processor to change the activity includes one or more instructions, which when executed by the at least one processor, causes the at least one processor to reduce the activity of the processing unit.

According to one aspect, the computer readable storage medium further includes one or more instructions, which when executed by the at least one processor, causes the at least one processor to: determine whether an activity of the processing unit satisfies the maximum allowed activity for the processing unit; and change the activity of the processing unit until the activity does not satisfy the maximum allowed activity for the processing unit. In some implementations, the one or more instructions, which when executed by the at least one processor, causes the at least one processor to change the activity includes one or more instructions, which when executed by the at least one processor, causes the at least one processor to increase the activity of the processing unit.

According to an aspect, the temperature of the electronic device is the temperature of an exterior surface portion of the electronic device, the temperature rate change of the electronic device being the temperature rate change of the exterior surface portion of the electronic device.

According to one aspect, the temperature is an estimated temperature based on a processing unit temperature of the processing unit.

According to an aspect, the computer readable storage medium is incorporated into at least one of a music player, a video player, an entertainment unit, a navigation device, a communications device, a mobile device, a mobile phone, a smartphone, a personal digital assistant, a fixed location terminal, a tablet computer, a laptop computer, an eyeglass, a watch and/or wearable device.

A fourth example provides an electronic device that includes a memory configured to store one or more instructions, at least one processing circuit configured to: determine a sensation value based on (i) a temperature of the electronic device, and (ii) a temperature rate change of the electronic device; and associate based on the determined sensation value, a discomfort level from a plurality of discomfort levels to the electronic device, the discomfort level specifying a maximum allowed activity for a processing circuit of the electronic device, at least one discomfort level being dynamically adjustable.

According to an aspect, the sensation value is based on an adjustable sensation model that includes a static sensation model and a dynamic sensation model. In some implementations, the adjustable sensation model is based on at least one thermal coefficient constant. In some implementations, at least one thermal coefficient constant is adjustable, the adjustable thermal coefficient constant specifying a range of temperature values for an adjustable discomfort level. In some implementations, the range of temperature values for the adjustable discomfort level comprises a maximum temperature, the maximum temperature based on a minimum value of one of at least a sensation value, regulation limit, and/or manufacturer limit.

According to one aspect, the at least one processing circuit is further configured to: determine whether an activity of the processing circuit satisfies the maximum allowed activity for the processing circuit; and change the activity of the processing circuit when the activity does not satisfy the maximum allowed activity for the processing circuit. In some implementations, changing the activity includes reducing the activity of the processing circuit.

According to an aspect, the at least one processing circuit is further configured to: determine whether an activity of the processing circuit satisfies the maximum allowed activity for the processing circuit; and change the activity of the processing circuit until the activity does not satisfy the maximum allowed activity for the processing circuit. In some implementations, changing the activity includes increasing the activity of the processing circuit.

According to one aspect, the temperature of the electronic device is the temperature of an exterior surface portion of the electronic device, the temperature rate change of the electronic device being the temperature rate change of the exterior surface portion of the electronic device.

According to an aspect, the temperature is an estimated temperature based on a processing circuit temperature of the processing circuit.

According to one aspect, the processing circuit is one of at least a central processing unit (CPU) and/or a graphical processing unit (GPU).

According to an aspect, the electronic device is at least one of a music player, a video player, an entertainment unit, a navigation device, a communications device, a mobile device, a mobile phone, a smartphone, a personal digital assistant, a fixed location terminal, a tablet computer, a laptop computer, an eyeglass, a watch and/or wearable device.

DRAWINGS

Various features, nature and advantages may become apparent from the detailed description set forth below when taken in conjunction with the drawings in which like reference characters identify correspondingly throughout.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

Overview

Several novel features pertain to a method for performing thermal management of an electronic device. The method determines a sensation value based on (i) a temperature of the electronic device, and (ii) a temperature rate change of the electronic device. The method associates a discomfort level from a plurality of discomfort levels, based on the determined sensation value, to the electronic device. At least one discomfort level is dynamically adjustable. In some implementations, the sensation value is based on a user adjustable sensation model. In some implementations, the user adjustable sensation model is based on one of several thermal coefficient constants. The discomfort level specifies a maximum allowed activity for a processing unit of the electronic device. In some implementations, the discomfort level specifies how thermally uncomfortable the electronic device is for a user of the electronic device. In some implementations, each discomfort level from the several discomfort levels is associated with a particular range of sensation values.

Exemplary Electronic Device that Includes a Thermal Management Unit

Figure 1:
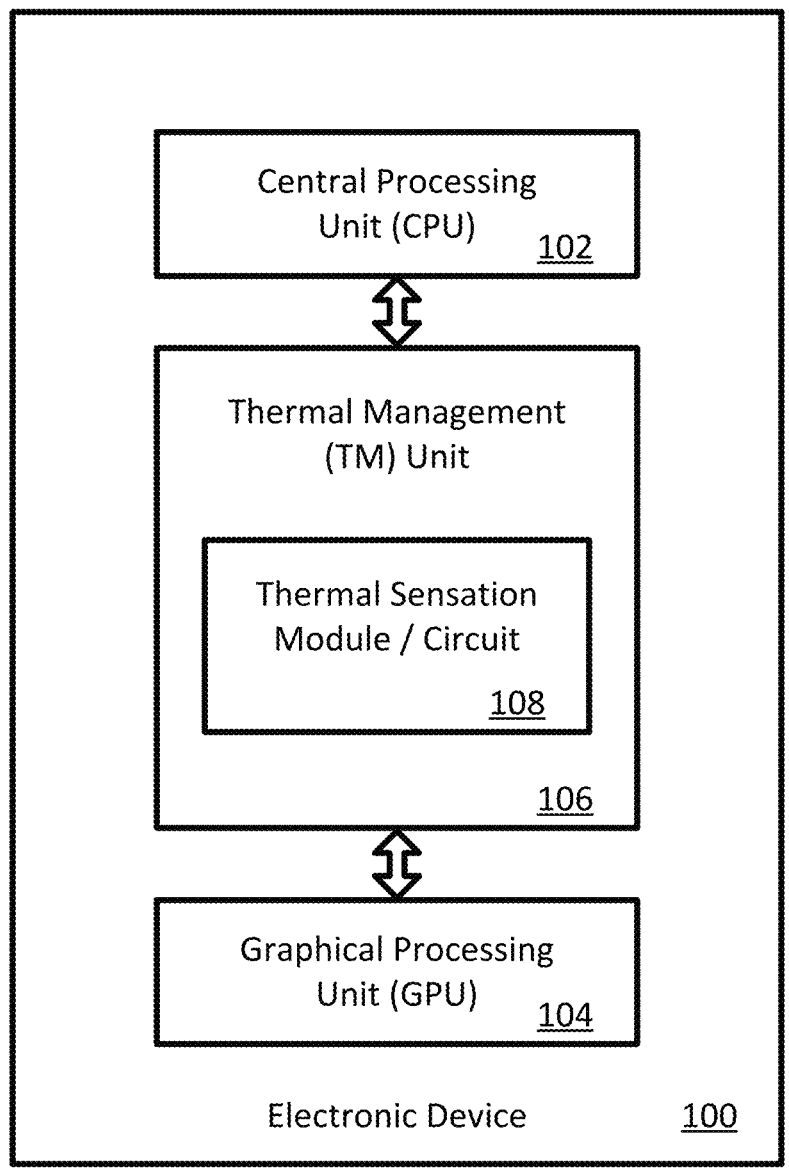
FIG. 1 illustrates an electronic device that includes a thermal management unit.

FIG. 1 illustrates a conceptual electronic device that includes a thermal management unit having novel features. As shown in FIG. 1, an electronic device 100 includes a central processing unit (CPU) 102, a graphical processing unit (GPU) 104, and a thermal management (TM) unit 106. The electronic device 100 may be a portable handheld electronic device. Examples of portable handheld electronic device include tablets and smart phones. The CPU 102 and/or GPU 104 may be processing units that are system-on-chip (SoC).

As shown in FIG. 1, the thermal management unit 106 may be a separate integrated circuit/module from the CPU 102 and GPU 104. However, in some implementations, the thermal management unit 106 may be integrated with the CPU 102 and/or the GPU 104. The thermal management unit 106 is configured to control the operation/activity of the CPU 102 and/or GPU 104 (and/or other processing units). For example, the thermal management unit 106 may limit or throttle the operating clock frequency of the CPU 102 and/or GPU 104 in some implementations. The thermal management unit 106 may also limit the clock frequency of the bus coupled to the CPU 102 and/or GPU 104 in some implementations. As further shown in FIG. 1, the thermal management unit 106 includes a thermal sensation module/circuit 108. In some implementations, the thermal sensation module/circuit 108 provides an implementation for performing thermal management of an electronic device.

Figure 2:
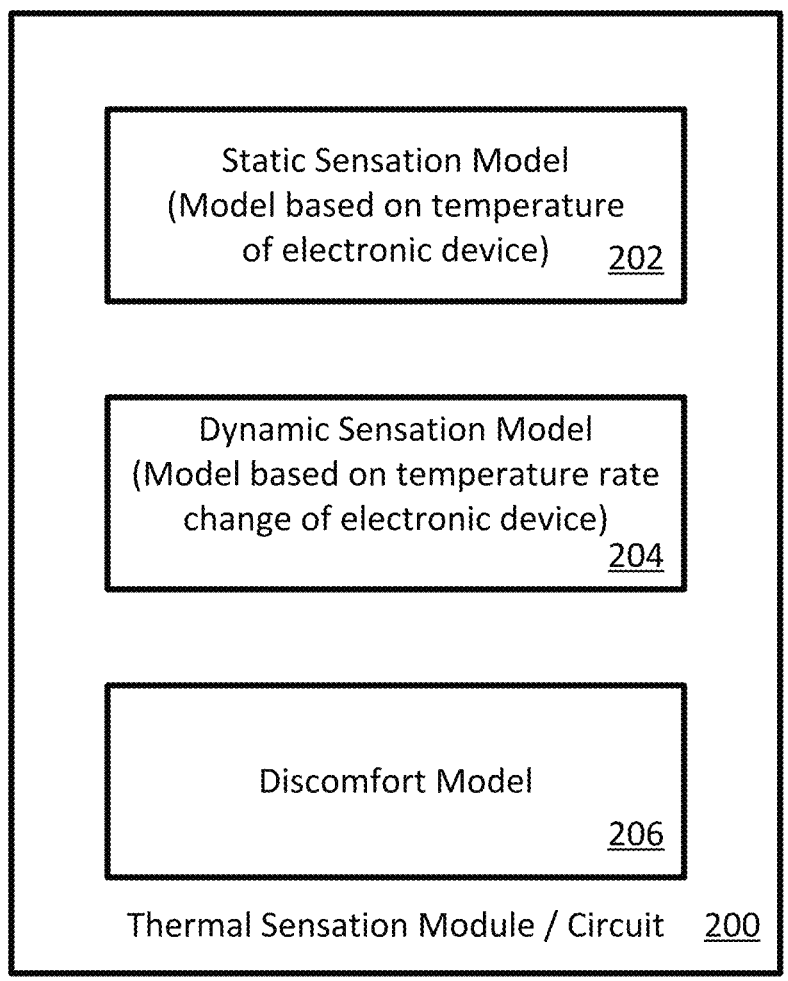
FIG. 2 illustrates a thermal sensation module/circuit of a thermal management unit.

FIG. 2 conceptually illustrates a thermal sensation module/circuit for a thermal management unit. Specifically, FIG. 2 illustrates a thermal sensation module/circuit 200 that includes a static sensation model 202, a dynamic sensation model 204 and a discomfort model 206. In some implementations, the thermal sensation module/circuit 200 is the thermal sensation module/circuit 108 of FIG. 1. In some implementations, the static sensation model 202 and the dynamic sensation model 204 quantify a user thermal sensation. Different implementations may use the models 202-206 differently. In one implementation, the static sensation model 202 and the dynamic sensation model 204 are used. In another implementation, all three models, namely the static sensation model 202, the dynamic sensation model 204, and the discomfort model 206 are used to perform thermal management.

The static sensation model 202 includes a model that takes into consideration the temperature of the electronic device when performing thermal management. In some implementations, the static sensation model 202 specifies the maximum temperature of an electronic device that a user may tolerate. In some implementations, a user may tolerate an exterior surface temperature of the electronic device of 45° C. or less.

In some implementations, the temperature of the electronic device may be the temperature of a processing unit (e.g., CPU 102, GPU 104) of the electronic device. The temperature of the electronic device may be the temperature of a region comprising the processing unit in some implementations. The temperature of the electronic device may be the temperature of an exterior surface portion (e.g., screen, outer surface) of the electronic device in some implementations. Moreover, the temperature of the electronic device may be a measured temperature (e.g., using dedicated temperature sensors to measure exterior surface) and/or an estimated temperature (e.g., based on temperature models) of the electronic device.

The dynamic sensation model 204 includes a model that takes into consideration the temperature rate change of the electronic device when performing thermal management. The temperature rate change specifies how fast a temperature change occurs for example. In some implementations, the dynamic sensation model 204 may specify that a user may tolerate a temperature rate change of 0.05° C./second or less.

In some implementations, the temperature rate change of the electronic device may be the temperature rate change of a processing unit (e.g., CPU 102, GPU 104) of the electronic device. The temperature rate change of the electronic device may be the temperature rate change of a region comprising the processing unit in some implementations. The temperature rate change of the electronic device may be the temperature rate change of an exterior surface portion (e.g., screen, outer surface) of the electronic device in some implementations. Moreover, the temperature rate change of the electronic device may be a computed temperature rate change and/or an estimated temperature rate change of the electronic device.

In some implementations, a thermal management unit (e.g., thermal management unit 106) may use both the static sensation model 202 and the dynamic sensation model 204 to perform thermal management. In some implementations, the static sensation model 202 may include a thermal model that is expressed by the following equation (1):

$$\text{Sensation}_{static} = C_0 \left( \frac{2}{1 + e^{-C_1(T_{skin} - T_{ref})}} - 1 \right) \quad (1)$$

where $C_0$ and $C_1$ represent thermal coefficient constants, $T_{skin}$ represents the temperature of an exterior surface portion of the electronic device (e.g., exterior surface portion that a user may hold/touch), and $T_{ref}$ represents the temperature of a reference. In some implementations, $T_{ref}$ represents the temperature of human body (e.g., 45° C.).

In some implementations, the dynamic sensation model 204 may include a thermal model that is expressed by the following equation (2):

$$\text{Sensation}_{dynamic} = C_2 \frac{dT_{skin}}{dt} \quad (2)$$

where $C_2$ represents a thermal coefficient constant and $T_{skin}$ represents the temperature of the exterior surface portion of the electronic device (e.g., exterior surface portion that a user may hold/touch). In some implementations, the combined static and dynamic sensation models may be combined and may be expressed by the following equation (3):

$$\text{Sensation} = C_0 \left( \frac{2}{1 + e^{-C_1(T_{skin} - T_{ref})}} - 1 \right) + C_2 \frac{dT_{skin}}{dt} \quad (3)$$

Different implementations may use the models differently. In some implementations, the thermal management unit may independently use the models expressed in equations (1) and (2). In some implementations, the thermal management unit may use the model expressed in equation (3). As will be further described below, one or more of the thermal coefficient constants (e.g., $C_0$, $C_1$, and/or $C_2$) may be configurable and/or adjustable by a user. In some implementations, the thermal coefficient constants are configurable and/or adjustable in order to tune the model from user-to-user sensation level variations.

Based on these static sensation models 202-204, the thermal management unit may perform several different functions. In some instances, the thermal management unit may throttle or reduce the activity (e.g., reduce the clock speed/frequency of a processing unit (e.g., CPU 102, GPU 104). In some instances, the thermal management unit may restrict or limit any additional activity of the processing unit. For example, the thermal management unit may allow the processing unit to operate at the current clock speed/frequency, but may not allow the processing unit to increase its activity. In some instances, the thermal management unit may allow the processing unit to increase its activity (e.g., increase clock speed/frequency), such as operating in turbo mode. For example, the activity of the processing unit may increase as long as the temperature felt by the user (e.g., temperature of exterior surface portion of the electronic device) is less than 45° C. and that the rate of change in the temperature as a result of the increase in activity is less than 0.05° C./second. Moreover, in some implementations, the increase in activity may be limited even though the processing may be capable of performing more activity. For example, the processing unit may be currently operating at 1 Ghz, but may capable of operating at 1.6 Ghz. In some implementations, the processing may be allowed to operate at 1.4 Ghz instead of allowing the processing unit to operate at its maximum speed.

In some implementations, the thermal management unit may also use a discomfort model (e.g., discomfort model 206) to perform thermal management of an electronic device. In such instances, the thermal management unit may associate an electronic device to a particular discomfort level from several possible discomfort levels. In some implementations, the discomfort level that is associated to the electronic device is based on the static sensation value and/or dynamic sensation value. Different implementations may use different discomfort models and discomfort levels. A discomfort level may specify how thermally uncomfortable the electronic device is for the user of the electronic device based on (i) the temperature and (ii) the temperature rate change. More specifically, a discomfort level may specify how thermally uncomfortable the electronic device is for the user of the electronic device based on (i) the static sensation value (e.g., Equation 1), and/or (ii) the dynamic sensation value (e.g., Equation 2). Based on the discomfort level that is associated with the electronic device, one or more different operations may be performed by the thermal management unit and/or the processing unit (e.g., CPU).

In one example, some implementations may use a discomfort model that includes three discomfort levels. Specifically, some implementation may use a first discomfort level (e.g., annoying level), a second discomfort level (e.g., perceptible discomfort level), and a third discomfort level (e.g., imperceptible discomfort level). Each discomfort level may be associated with a range of sensation values that may be computed from the sensation models described above (e.g., Equations 1-3). For example, in some implementations, a first range (e.g., first higher range) of sensation values may be associated with the first discomfort level, a second range (e.g., second high range, second medium range) of sensation values may be associated with the second discomfort level, and a third range (e.g., third low range) of sensation values may be associated with the third discomfort level. Thus, for example, when the computed sensation value(s) for the electronic device is within the second range of sensation values, the second discomfort level is associated with the electronic device.

In some implementations, when the first discomfort level is associated with the electronic device, the activity of a processing unit may be decreased (e.g., throttling of processing unit). In some implementations, when the second discomfort level is associated with electronic device, the activity of the processing unit may not be allowed to be increased. In some implementations, when the third discomfort level is associated with the electronic device, the activity of the processing unit may be allowed to be increased. For example, the processing unit may be allowed to operate in turbo mode. In some implementations, turbo mode includes temporarily increase the processing capability (e.g., increasing clock speed or clock frequency) of the processing unit. In some implementations more than three discomfort levels may be used. Similarly, in some implementations, less than three discomfort levels may be used. As such, the discomfort levels described above are merely exemplary. Similarly, the discomfort level names described above are merely exemplary.

Having described a thermal management unit and the several models (e.g., sensation models and discomfort model) that the thermal management unit may use to perform thermal management of an electronic device, thermal/temperature profiles for an electronic device and methods for performing thermal management for some implementations will now be described.

Exemplary Thermal/Temperature Profiles and Discomfort Levels

Figure 3:
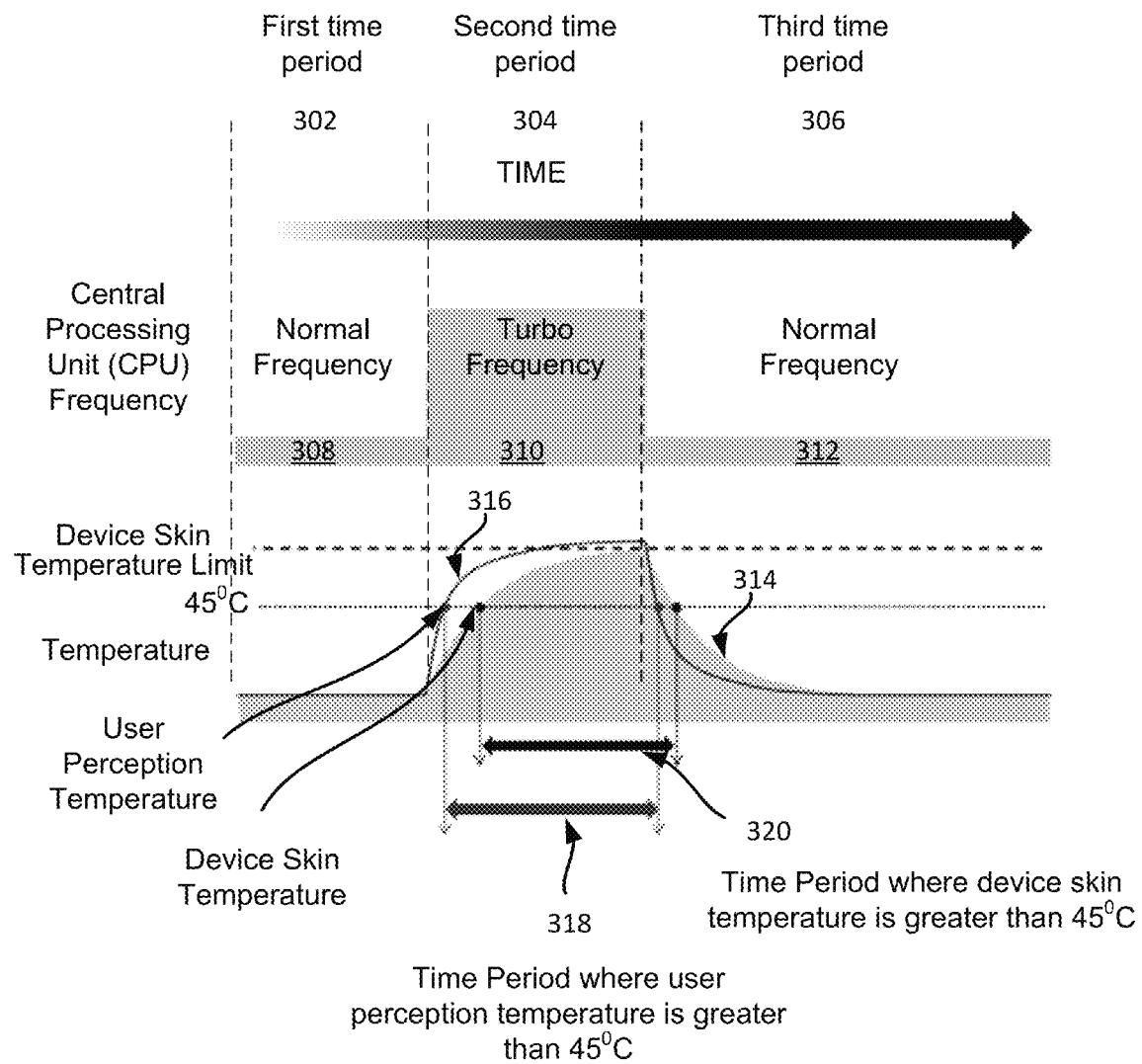
FIG. 3 illustrates thermal profiles based on the operation of a processing unit

FIG. 3 illustrates a diagram showing temperature profiles over time based on an operating frequency of a processing unit (e.g., CPU, GPU) of an electronic device. As shown in FIG. 3, the processing unit may operate at several frequencies. More specifically, the processing unit operates in a first time period 302 at a first operating frequency 308 (e.g., normal operating frequency), in a second time period 304 at a second operating frequency 310 (e.g., turbo frequency), and in a third time period 306 at a third operating frequency 312 (e.g., normal operating frequency). In some implementations, the third operating frequency 312 may be the same frequency as the second operating frequency 308.

FIG. 3 also illustrates an exemplary corresponding temperature profile 314 of the device (e.g., surface/skin temperature of the device that includes processing unit) and temperature profile 316 felt by a user based on the processing activity/operation of the processing unit in the device. As shown in FIG. 3, during the first time period 302, the temperature of the device and the temperature felt by the user are the same or roughly the same. During the second time period 304, when the activity of the processing unit increases and thus increases the temperature of the device, FIG. 3 illustrates that the temperature felt by the user is higher than the actual temperature of the device. Thus, even thought the device temperature has not reached a particular temperature (e.g., 45° C.), the user of the device feels as if the device has reached that particular temperature. This is because, as described above, the rate of change in the temperature of the device as a result of the increase in processing activity of the processing unity in the device causes the user to feel a hotter temperature than the actual temperature of the device. During the third time period 306, the processing unit returns to the third frequency 312 (e.g., normal frequency), which means that processing unit's activity has been reduced, resulting in a lower temperature of the device. As the device begins to cool because of the lower operating frequency, the user feels a lower temperature than the actual temperature of the device. In order words, during the third period 306, as the device cools down, the user may feel a particular temperature (e.g., 45° C.) before the device reaches that particular temperature (45° C.). Again, as described above, this is the result of the rate of change in the temperature of the device.

As shown in FIG. 3, there is an offset between the time period 318 that a user may perceive the device temperature to be greater than a particular temperature (45° C.) and the time period 320 that the device (e.g., surface of device) has a temperature that is greater than the particular temperature (45° C.). In some implementations, the models and methods described in the present disclosure provide a way for minimizing and/or reducing the offset between the two time periods 318-320.

Figure 4:
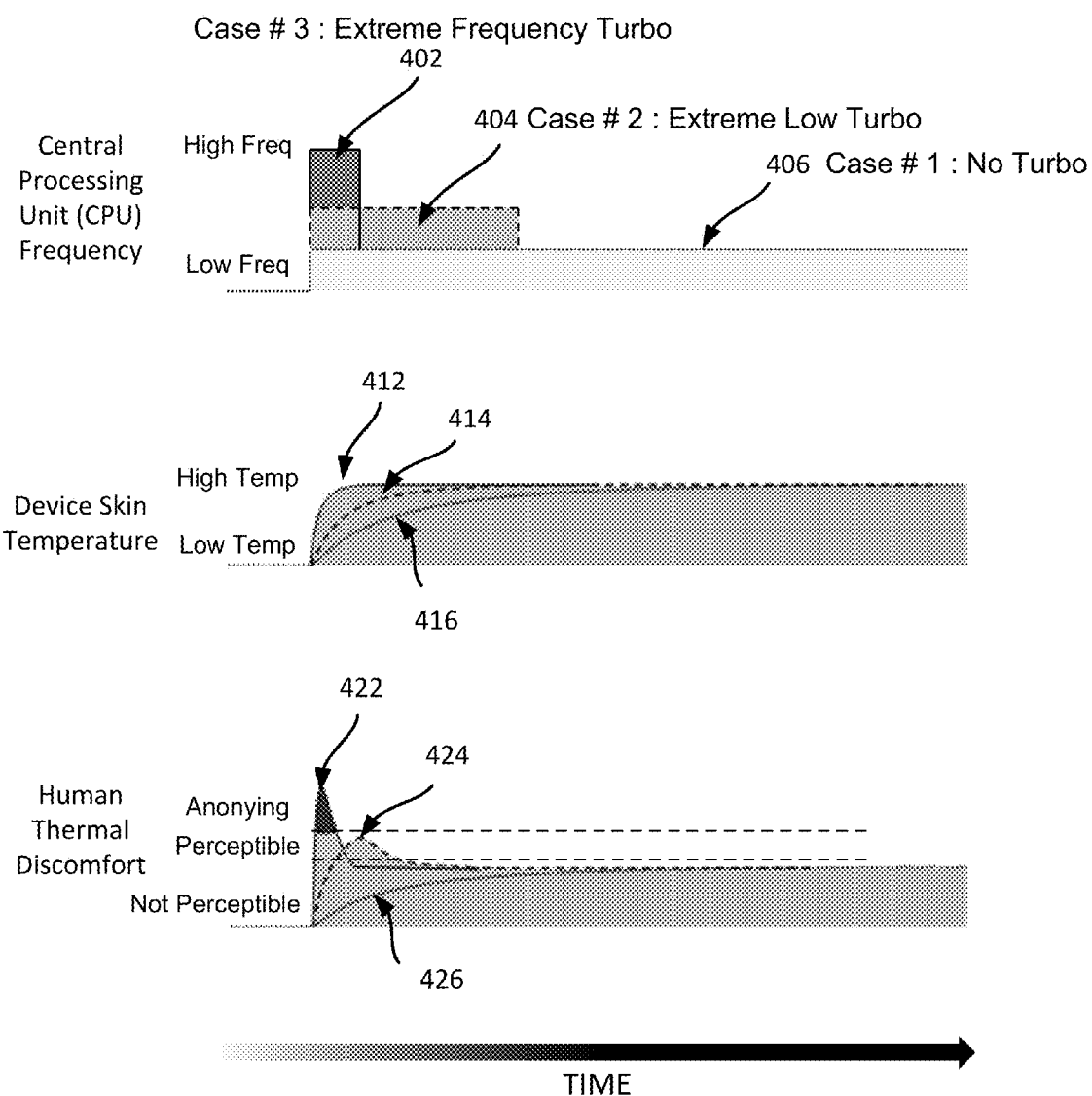
FIG. 4 illustrates a diagram of how the temperature of a device and the discomfort of a user may be affected based on a change in activity of a processing unit in the device.

FIG. 4 illustrates a diagram of how the temperature of a device and the discomfort of a user may be affected based on a change in activity of a processing unit in the device. Specifically, FIG. 4 illustrates how three different activities may affect the temperature of a device and the discomfort of a user in some implementations.

FIG. 4 illustrates a processing unit (e.g., CPU) that may increase under three cases/scenarios, namely (i) a first case 402, where the processing unit increases from a low frequency to a first frequency (e.g., extreme frequency turbo), (ii) a second case 404, where the processing unit increases from a low frequency to a second frequency (e.g., extreme low turbo), and (iii) a third case 406, where the processing unit increases from a low frequency to a third frequency (e.g., regular frequency without turbo).

As further shown in FIG. 4, in the first case 402, the temperature of the device (e.g., surface/skin temperature of the device) increases substantially, resulting in a first temperature profile 412. Moreover, the human thermal discomfort model shows that the first case 402 results in an annoying sensation profile 422. In some implementations, the annoying sensation profile 422 is profile that represents a discomfort that is perceptible by the user and warrants a change (e.g., reduction) in the activity of the processing unit.

In the second case 404, the temperature of the device (e.g., surface/skin temperature of the device) increases (but not as substantially as in the first case 402), resulting in a second temperature profile 414. Moreover, the human thermal discomfort model shows that the second case 404 results in a perceptible sensation profile 424. In some implementations, the perceptible sensation profile 424 is profile that represents a discomfort that is perceptible by the user but not enough to warrant any change in the activity of the processing unit.

In the third case 406, the temperature of the device (e.g., surface/skin temperature of the device) increases (but not as substantially as in the second case 404), resulting in a third temperature profile 416. Moreover, the human thermal discomfort model shows that the third case 406 results in an imperceptible sensation profile 426. In some implementations, the imperceptible sensation profile 426 is profile that represents a discomfort that is not perceptible by the user and does not warrant a change (e.g., reduction) in the activity of the processing unit.

Having described a thermal/temperature profile for an electronic device, methods for performing thermal management for some implementations will now be described.

Exemplary Methods for Thermal Management of an Electronic Device

Figure 5:
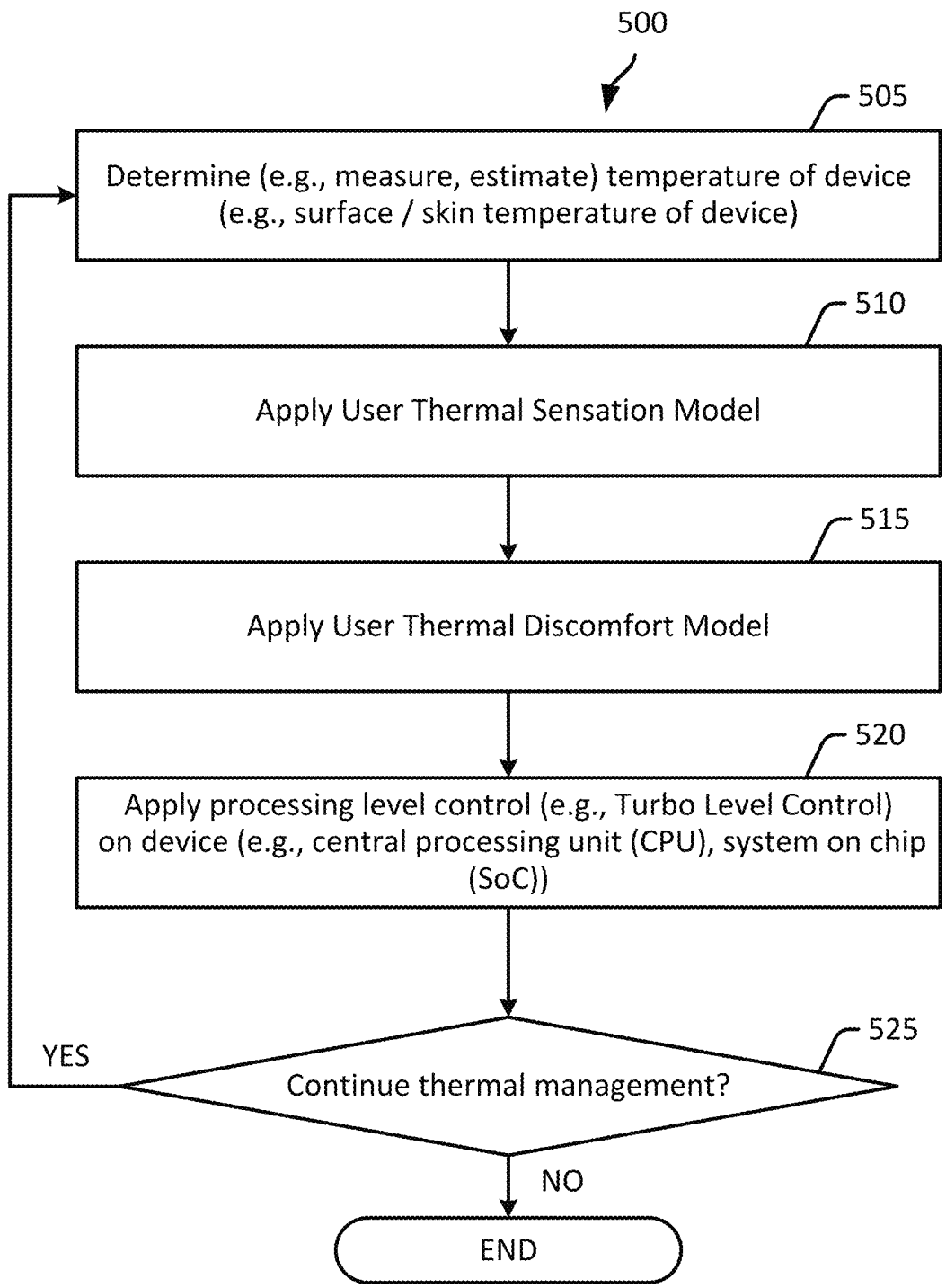
FIG. 5 illustrates a flow diagram of a method for performing thermal management based on one or more models.

FIG. 5 illustrates a flow diagram of a method for performing thermal management based on one or more models (e.g., sensation models and a discomfort model). As shown in FIG. 5, the method determines (at 505) the temperature of the device. In some implementations, determining (at 505) the temperature may include measuring the temperature of the device and/or estimating the temperature of the device. The temperature of the device may be the temperature of the surface/skin of the device in some implementations. The temperature of the device may be the temperature of a processing unit (e.g., CPU, GPU) in a device in some implementations. In some implementations, the temperature of the device may be a combination of several temperatures of different components (e.g., surface, processing unit) of the device.

In some implementations, when the method measures the temperature of the device to determine (at 505) the temperature of the device, the method may use dedicated temperature sensors on and/or near the surface of the device and/or temperature sensors on and/or near one or more processing units. Different implementations may measure the temperature of the device differently.

In some implementations, when the method estimates the temperature of the device to determine (at 505) the temperature of the device, the method may get input from the power performance/state of one or more processing units and/or SOC on the device to estimate the temperature of the device. For example, the method may measure how much current/voltage is being drawn/used by one or more components (e.g., processing unit, SoC) of the device to estimate the temperature of the device. In some implementations, temperature estimation models may be used to estimate the temperature of the device. These temperature estimate models may be based on voltage, current, operating frequency and/or time of operation.

Once the temperature of the device is determined (at 505), the method applies (at 510) a user thermal sensation model. In some implementations, applying (at 510) the user thermal sensation model includes computing a value that includes the static sensation value and/or the dynamic sensation value of the device based on the determined temperature of the device. In some implementations, applying the user thermal sensation model may include computing one or more sensation values. In some implementations, determining (e.g., computing) the sensation value includes using Equations 1, 2 and/or 3 described above based on the determined temperature of the device.

Next, the method applies (at 515) a user thermal discomfort model based on results of the applied user thermal sensation model. Different implementations may use different user thermal discomfort models. In one example, a user thermal discomfort model may includes a first annoying discomfort level, a second perceptible discomfort level, and a third imperceptible discomfort level. The use of user thermal discomfort models will be further described below.

After applying (at 515) the user thermal discomfort model, the method applies (at 520) a processing level control (e.g., turbo level control) on the device based on the results of the user thermal discomfort model. In some implementations, applying (at 520) the processing level control includes specifying (at 520) a maximum allowed activity for the processing unit (e.g., CPU, GPU) based on the user thermal discomfort level. The maximum allowed activity may specify the maximum clock speed or clock frequency of the processing unit in some implementations.

Next, the method determines (at 525) whether to continue the thermal management of the device. If so, the method proceeds back to 505 to determine the temperature of the device. In some implementations, the method may determine the temperature of the device by either measuring the temperature of the device and/or estimating the temperature of the device. In some implementations, several iterations of determining the temperature, applying the models and applying the processing level controls may be performed. In some implementations, the method ends, when the method determines (at 525) not to continue with the thermal management of the device.

Figure 6:
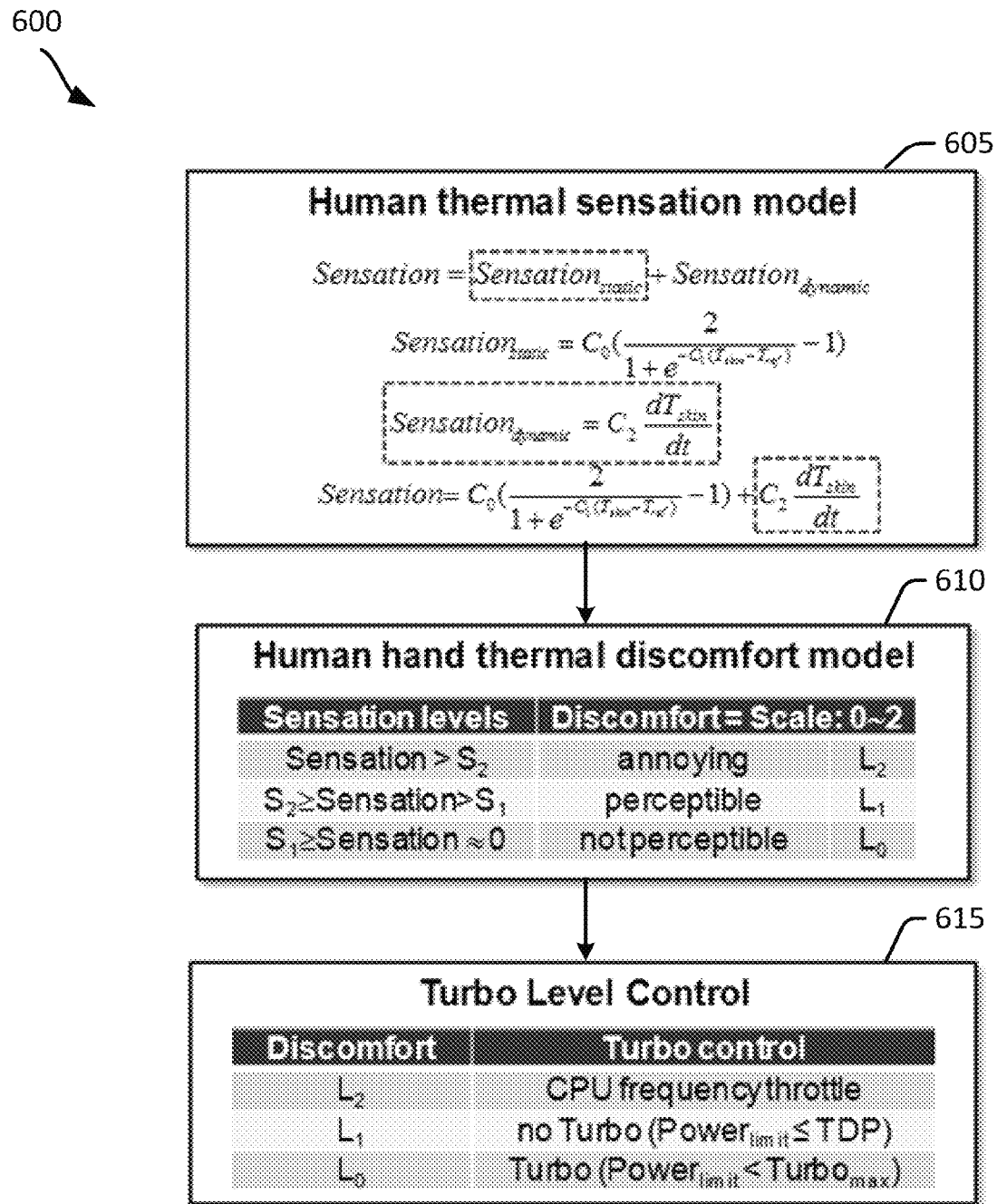
FIG. 6 illustrates a diagram of the various models (e.g., sensation models and a discomfort model) used in some implementations.

FIG. 6 illustrates a diagram of the various models (e.g., sensation models and a discomfort model) used in thermal management in some implementations. In some implementations, the models described in FIG. 6 may be applied in the flow diagram of FIG. 5.

As shown in FIG. 6, the thermal sensation model 605 illustrates examples of various sensation values that may be determined and/or computed in some implementations. In some implementations, determining (e.g., computing) the sensation value includes using Equations 1, 2 and/or 3 described above based on the determined temperature of the device. In some implementation, these sensation values may be computed based on an input temperature. The input temperature may be the temperature of the device. In some implementations, the temperature of the device may include the surface/skin temperature of the device and/or temperature of one or more processing units (e.g., CPU, GPU) of the device. The temperature of the device may be a measured temperature and/or an estimated temperature in some implementations. In some implementations, the thermal sensation model 605 may be used when applying (at 510) the user thermal sensation model in FIG. 5.

The discomfort model 610 illustrates various discomfort levels associated with a corresponding sensation value. As shown in FIG. 6, when the sensation value is greater than a first sensation threshold limit (e.g., $S_2$), a first discomfort level (e.g., $L_2$) is specified. When the sensation value is less or equal to the first sensation threshold limit (e.g., $S_2$) and greater than a second sensation threshold limit (e.g., $S_1$), a second discomfort level (e.g., $L_1$) is specified. When the sensation value is less or equal to the second sensation threshold limit (e.g., $S_1$) and greater than a third sensation threshold limit (e.g., 0), a third discomfort level (e.g., $L_0$) is specified. In the example of FIG. 6, the first discomfort level is an annoying discomfort level, the second discomfort level is a perceptible discomfort level, and the third discomfort level is imperceptible discomfort level. However, different implementations may use different discomfort levels, including having different numbers of discomfort levels. In some implementations, the discomfort sensation model 610 may be used when applying (at 515) the user discomfort sensation model in FIG. 5.

The turbo level control 615 (e.g., processing unit level control) illustrates various processing controls that may be applied to one or more processing units in the device. As shown in FIG. 6, the first discomfort level (e.g., $L_2$) is associated with a throttling of the processing unit. In some implementations, when the first discomfort level is specified/associated with the device, the thermal management may instruct the processing unit to reduce its activity (e.g., reduce operating frequency). As further shown in FIG. 6, the second discomfort level (e.g., $L_1$) is associated with no increase in activity allowed in the processing unit. In some implementations, when the second discomfort level is specified/associated with the device, the thermal management may instruct the processing unit not to increase its activity (e.g., maintain operating frequency). The processing unit may still be allowed to decrease its activity when in the second discomfort level. FIG. 6 shows that the third discomfort level (e.g., $L_0$) is associated with an increase in activity allowed in the processing unit. In some implementations, when the third discomfort level is specified/associated with the device, the thermal management may instruct the processing unit it is allowed to increase its activity (e.g., increase operating frequency). The processing unit may still be allowed to decrease its activity when in the third discomfort level. In some implementations, the turbo level control 615 may be used when applying (at 520) the processing level control in FIG. 5.

Having described specific methods for performing thermal management of a device, general methods for performing thermal management for some implementations will now be described.

Exemplary Method for Thermal Management of an Electronic Device

Figure 7:
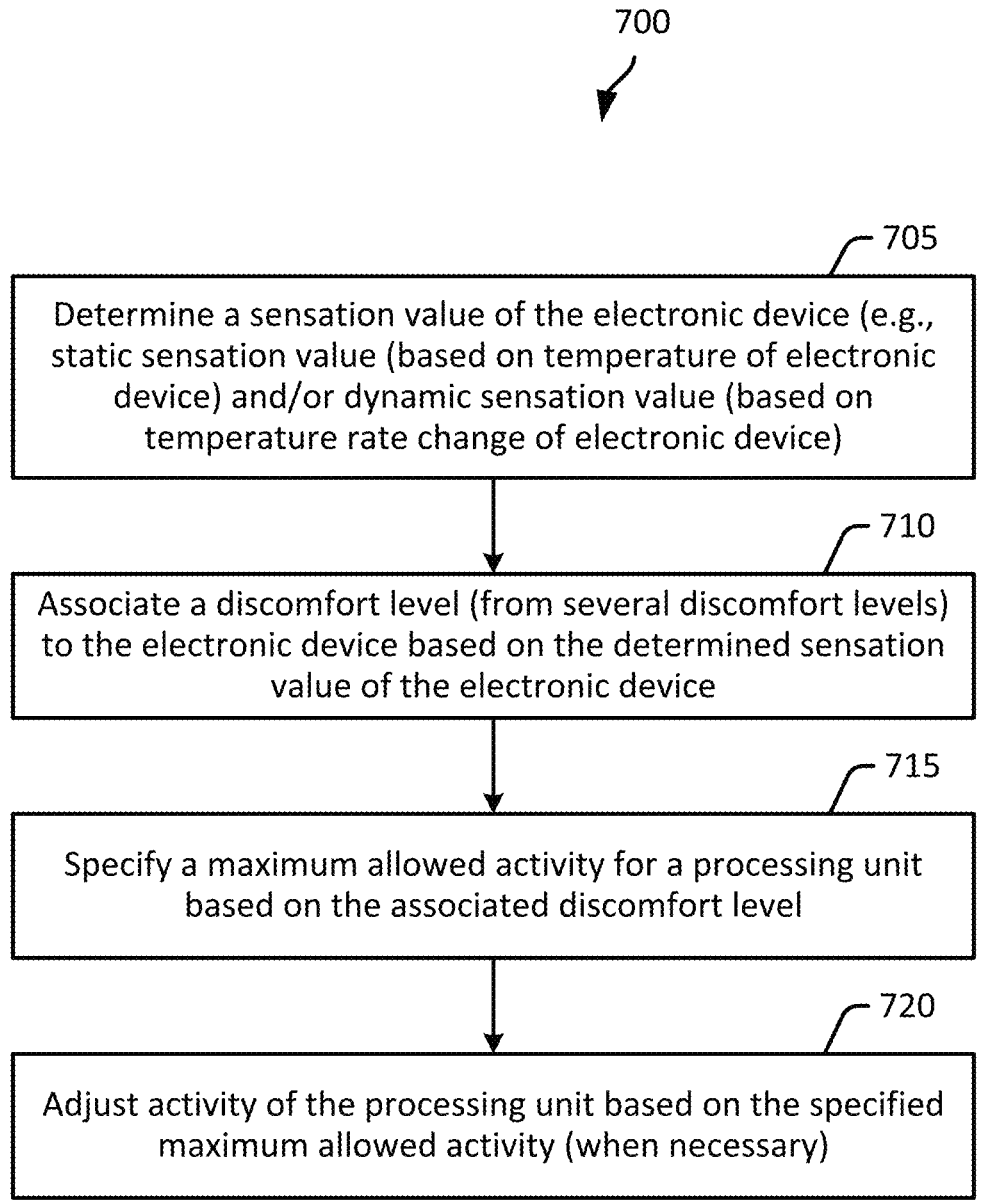
FIG. 7 illustrates a flow diagram of a method for performing thermal management based on one or more models.

FIG. 7 illustrates a flow diagram of a method for performing thermal management based on one or more models (e.g., sensation models and a discomfort model). As shown in FIG. 7, the method determines (at 705) the sensation value of the electronic device. In some implementations, determining (at 705) the sensation value includes computing a value that includes the static sensation value and/or the dynamic sensation value of the electronic device. In some implementations, the sensation value is based on a temperature of the electronic device and/or a temperature rate change of the electronic device. In some implementations, determining the sensation value may include computing one or more sensation values. In some implementations, determining (e.g., computing) the sensation value includes using Equations 1, 2 and/or 3 described above.

Next, the method associates (at 710) a discomfort level (from several possible discomfort levels) to the electronic device based on the determined sensation value of the electronic device. In some implementations, associating (at 710) the discomfort level to the electronic device includes specifying how thermally uncomfortable the electronic device is for the user of the electronic device based on (i) the temperature and (ii) the temperature rate change. Different implementations may use different discomfort level, such as for example, a first annoying discomfort level, a second perceptible discomfort level, and a third imperceptible discomfort level.

After associating (at 710) a discomfort level to the electronic device, the method specifies (at 715) a maximum allowed activity for the processing unit (e.g., CPU, GPU) based on the associated discomfort level. The maximum allowed activity may specify the maximum clock speed or clock frequency of the processing unit in some implementations. The method further adjusts (at 720) the activity of the processing unit based on the specified maximum allowed activity. In some implementations, the adjustment (at 720) is made when necessary. For example, based on the specified maximum allowed activity, the processing unit may (i) reduce (e.g., throttle) its activity, keep the same activity (e.g., keep the same clock speed or clock frequency), or increase its activity (e.g., turbo mode, increase clock speed or clock frequency). Different implementations will make adjustments (if any) differently. In some implementations no adjustment is made to the activity of the processing unit. In some implementations, several iterations of the method of FIG. 7 may be performed.

In some implementations, the sensitivity of the response of the thermal management unit is configurable and/or adjustable by a user. That is, in some implementations, how the thermal management unit behaves due to temperature and temperature rate change can be specified by a user, instead of being limited to a single configuration and/or sensitivity.

Configurable and/or adjustable sensitivity of the thermal management unit may be desirable because different users may have different sensitivity to temperature and/or temperature rate change. For example, an infant and/or child may be more sensitive to temperature and/or temperature rate change than an adult. Similarly, a young adult (e.g., college student) may be more sensitive to temperature change and/or temperature rate change than an older adult user (e.g., grandparent) who may have less sensitive nerve endings.

In addition, different electronic device may be covered with different protective shells (e.g., case). These protective shells provide a layer of thermal insulation from heat that may be generated by the electronic device. Thus, when the electronic device is covered with a case, a higher temperature and/or temperature rate change may be tolerated or allowed relative to an electronic device without such a case. Consequently, the sensitivity of the thermal management unit may be configurable and/or adjustable by the user to account for specific characteristics associated with the user and/or the electronic device. In some implementations, the sensitivity of the thermal management unit may be based on one or more characteristics associate with a user including, age, occupation, region (e.g., dry area, humid area), gender.

In some implementations, adjusting and/or configuring the sensitivity of the thermal management unit may includes specifying one or more of the thermal coefficient constants of Equations 1-3 (e.g., $C_0$, $C_1$, and/or $C_2$).

Figure 8:
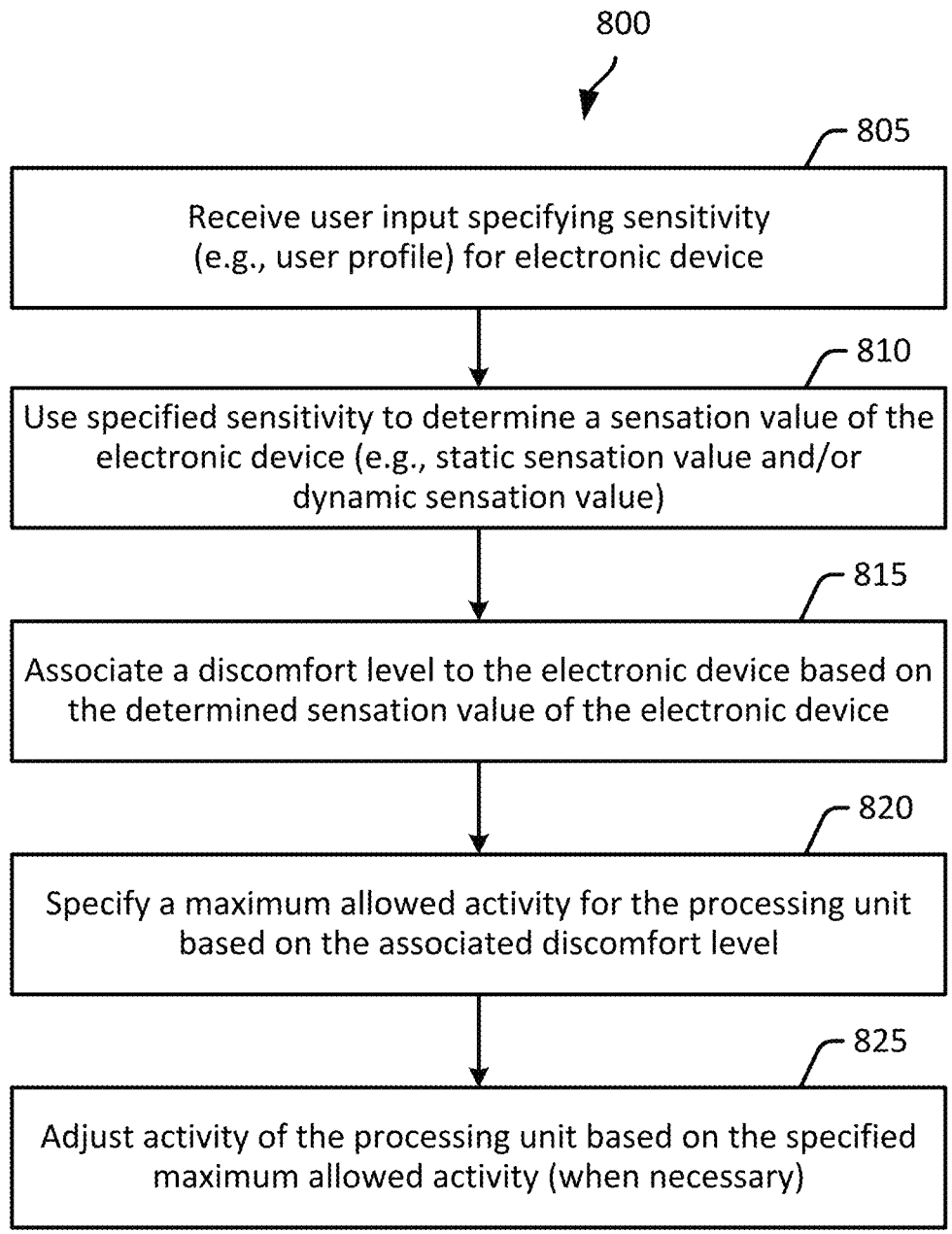
FIG. 8 illustrates a flow diagram of a method for performing thermal management based on one or more adjustable models.

FIG. 8 illustrates a flow diagram of a method for performing thermal management of an electronic device based on one or more configurable/adjustable models (e.g., sensation models and discomfort model). As shown in FIG. 8, the method receives (at 805) a user input specifying the sensitivity of the electronic device. In some implementations, specifying the sensitivity of the electronic device includes specifying a particular sensation model from several sensation models to be used when performing thermal management of the electronic device. The sensation model may represent a particular type of user (e.g., child, young adult, older adult) and/or type of case (if any) that may be used with the electronic device. In some implementations, the sensation model specifies how aggressive a thermal management of an electronic device will be in response to a temperature change and/or temperature rate change. In some implementations, specifying the sensitivity of the electronic device includes specifying one or more of the thermal coefficient constants of Equations 1-3 (e.g., $C_0$, $C_1$, and/or $C_2$). In some implementations, the sensitivity of the thermal management unit may be subject to minimum and/or maximum sensitivity values. These minimum and/or maximum sensitivity values may be specified by a manufacturer of the electronic device, and/or by regulation (e.g., government regulation). A method for adjusting the thermal coefficient constants is described in FIG. 9.

As further shown in FIG. 8, the method uses the specified sensitivity to determine (at 810) the sensation value of the electronic device. In some implementations, determining (at 810) the sensation value includes computing a value that includes the static sensation value and/or the dynamic sensation value of the electronic device. In some implementations, determining the sensation value may include computing one or more sensation values. In some implementations, determining (e.g., computing) the sensation value includes using Equations 1, 2 and/or 3 described above.

Next, the method associates (at 815) a discomfort level to the electronic device based on the determined sensation value of the electronic device. In some implementations, associating (at 815) the discomfort level to the electronic device includes specifying how thermally uncomfortable the electronic device is for the user of the electronic device based on (i) the temperature and (ii) the temperature rate change. Different implementations may use different discomfort levels, such as for example, a first annoying discomfort level, a second perceptible discomfort level, and a third imperceptible discomfort level.

After associating (at 815) a discomfort level to the electronic device, the method specifies (at 820) a maximum allowed activity for the processing unit based on the associated discomfort level. The maximum allowed activity may specify the maximum clock speed or clock frequency of the processing unit in some implementations. The method further adjust (at 825) the activity of the processing unit based on the specified maximum allowed activity. In some implementations, the adjustment (at 825) is made when necessary. For example, based on the specified maximum allowed activity, the processing unit may (i) reduce (e.g., throttle) its activity, keep the same activity (e.g., keep the same clock speed or clock frequency), or increase its activity (e.g., turbo mode, increase clock speed or clock frequency). Different implementations will make adjustments (if any) differently. In some implementations no adjustment is made to the activity of the processing unit. In some implementations, several iterations of the method of FIG. 8 may be performed.

In some implementations, the values of the thermal coefficient constants may be adjusted. Thus, in some implementations, the thermal coefficient constants are not constant. The adjustment of the values of the thermal coefficient constants may be made dynamically (e.g., during operation of the device and/or thermal management). One or more values of these thermal coefficient constants may be adjusted by the user and/or by the device (e.g., processing unit, thermal management unit). In some implementations, adjusting the values of the thermal coefficient constants may determine how responsive the thermal management unit is to changes in temperature of the device.

Figure 9:
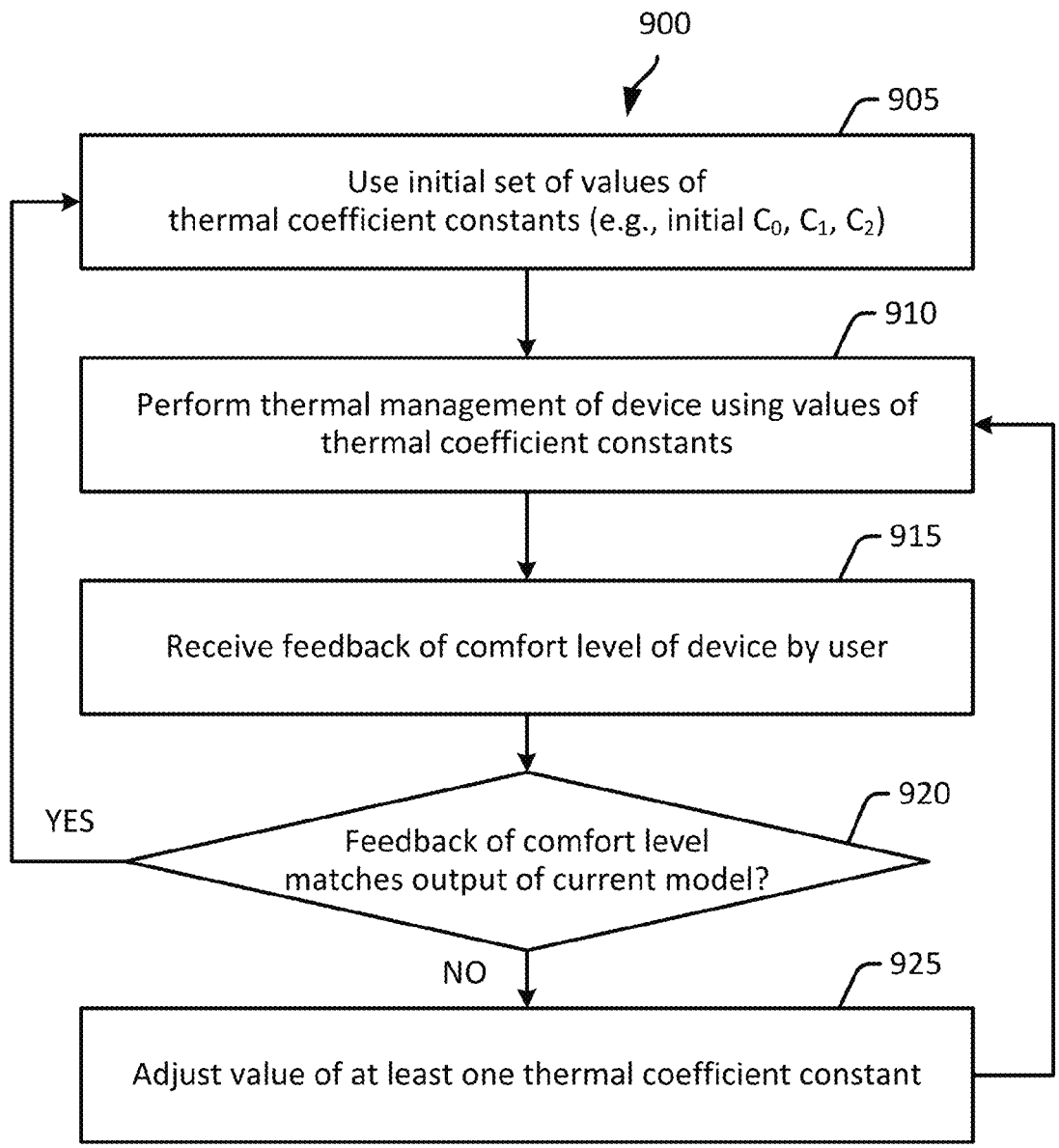
FIG. 9 illustrates a flow diagram of a method for adjusting one or more values of the thermal coefficient constants.

FIG. 9 illustrates a flow diagram of a method for adjusting one or more values of the thermal coefficient constants. As shown in FIG. 9, the method uses (at 905) an initial set of values for the thermal coefficient constants. These values may be initially specified by the manufacturer or may be initially specified by the user. The method then performs (at 910) thermal management of the device using the specified set of thermal coefficient constants. In some implementations, the method may perform (at 910) thermal management of the device using any of the thermal management methods described in the present disclosure. In some implementations, performing thermal management includes using Equations 1, 2 and/or 3 described above.

Next, the method receives (at 915) feedback of a comfort/discomfort level of the device by the user. Different implementations may receive feedback of the comfort/discomfort level differently. In some implementations, a user may voluntarily provide input of the thermal comfort and/or discomfort of the device by rating how comfortable and/or uncomfortable the device is (e.g., star, numerical value (1-10)) thereby providing feedback of comfort level of the device by the user. In some implementations, the device may query the user for feedback of a comfort/discomfort level of the device (e.g., when device has been operating in turbo mode for a certain period of time, when device approaches $L_1$ or $L_2$)

The method then determines (at 920) whether the received feedback matches the output of the current model (e.g., sensation model, discomfort model). For example, the method determines whether the comfort level of the device by the user matches the output of the discomfort model being used by the thermal management. If so, the method proceeds to 910 to continue to perform the thermal management of the device.

However, when the method determines (at 920) that the received feedback does not match the output of the current model, the method adjusts (at 925) one or more values of the thermal coefficient constants. Different implementations may adjust the values differently. Table 1 below illustrates various exemplary adjustments that may be made to one or more values of the thermal coefficient constants. Once the adjustment is made, the method proceeds back to 910 to continue performing the thermal management of the device. In some implementations, several iterations of the method of FIG. 9 may be performed. In addition, the operation of the method of FIG. 9 may be stopped at any time. It should also be noted that the time between adjustments of the values thermal coefficient constants may vary in some implementations.

Table 1 below illustrates exemplary adjustments that may be made to one or more values of the thermal coefficient constants during the method of FIG. 9.

TABLE 1

| State of Device | Condition | Adjustment |
| --- | --- | --- |
| Temperature Stable | Input of user discomfort > output of discomfort model | Increase $C_0$ |
| | Input of user discomfort < output of discomfort model | Decrease $C_0$ |
| Temperature Changed | Input of user discomfort > output of discomfort model | Increase $C_2$ |
| | Input of user discomfort < output of discomfort model | Decrease $C_2$ |

As shown in Table 1, when the temperature of the device is stable (e.g., remains roughly the same, does not change), and when the input of the user discomfort is greater than the output of the discomfort model, the thermal coefficient constant $C_0$ may be increased. However, when the temperature of the device is stable and when the input of the user discomfort is less than the output of the discomfort model, the thermal coefficient constant $C_0$ may be decreased.

As also shown in Table 1, when the temperature of the device has changed, and when the input of the user discomfort is greater than the output of the discomfort model, the thermal coefficient constant $C_2$ may be increased. However, when the temperature of the device has changed and when the input of the user discomfort is less than the output of the discomfort model, the thermal coefficient constant $C_2$ may be decreased.

In some implementations, the adjustments to the values of the thermal coefficient constants are adjustments to the thermal coefficient constants of Equations 1, 2 and/or 3 described above.

Having described a general overview of a method for thermal management of an electronic device, more detailed methods for thermal management of an electronic device will now be described below with reference to FIGS. 10-11.

Figure 10:
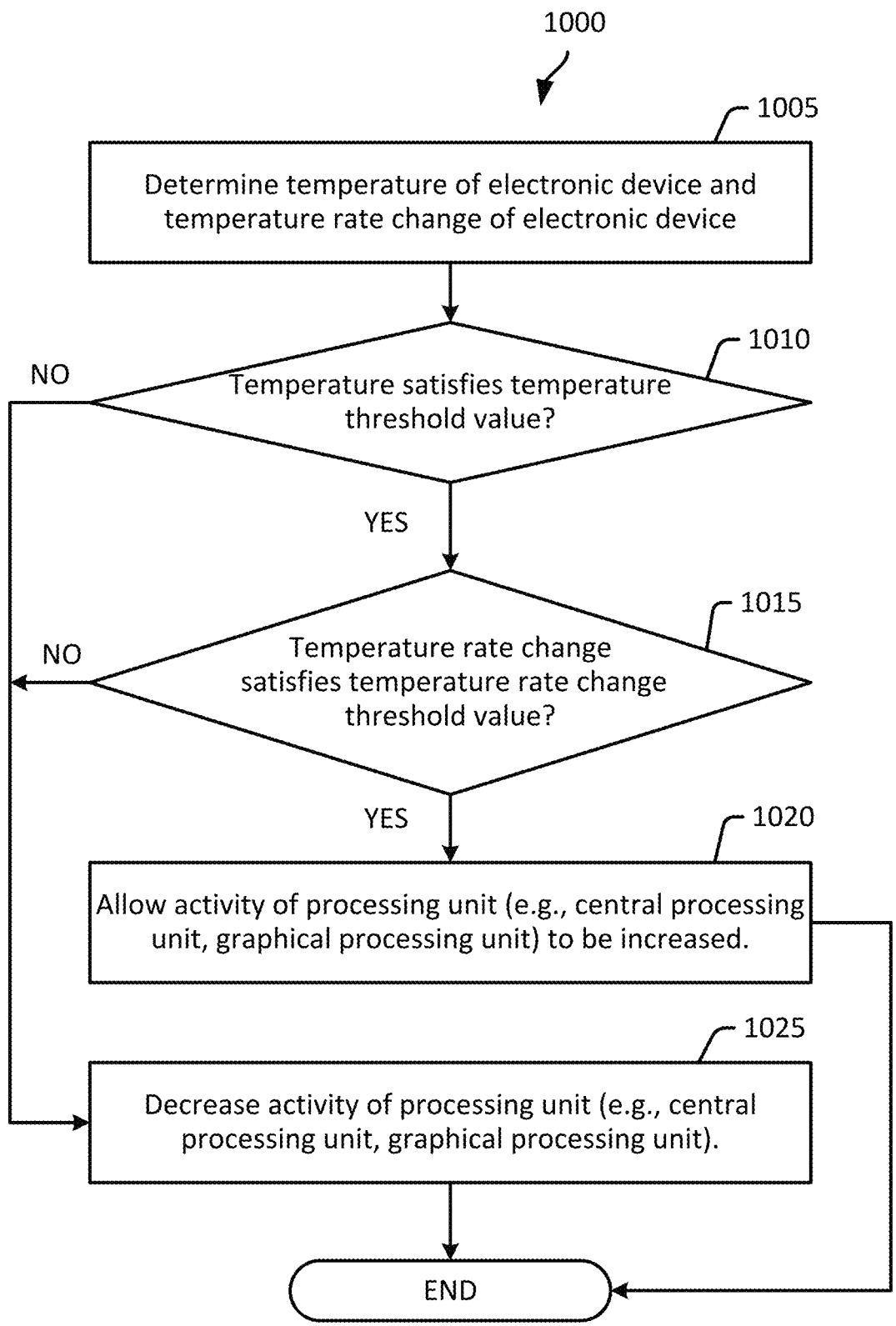
FIG. 10 illustrates a flow diagram of a method that a thermal management unit may perform to reduce on and limit the activity of a processing unit.

FIG. 10 illustrates a flow diagram of a method that a thermal management unit may perform in some implementations. Specifically, FIG. 10 illustrates a flow diagram of a method that a thermal management unit may perform to reduce or/and limit the activity of a processing unit in some implementations. As shown in FIG. 10, the method determines (at 1005) the temperature of the electronic device and the temperature rate change of the electronic device.

Different implementations may determine the temperature and temperature rate change differently. In some implementations, the temperature and the temperature rate change are the temperature and the temperature rate change of an exterior surface portion (e.g., screen, outer surface) of the electronic device. In some implementations, the temperature and the temperature rate change are the temperature and the temperature rate change of a processing unit (e.g., CPU, GPU) of the electronic device. In some implementations, determining the temperature and the temperature rate change includes computing and/or estimating the temperature and the temperature rate change of the electronic device. One or more sensors (e.g., temperature sensors) may be used to measure and/or estimate the temperature and/or temperate rate change of the electronic device. These sensors may be located anywhere in and/or around the electronic device.

Next, the method determines (at 1010) whether the temperature of the electronic device satisfies a temperature threshold value. In some implementations, the temperature threshold value is the maximum allowed temperature for an external surface portion of the electronic device. The maximum allowed temperature for the external surface portion of the electronic device may be 45° C. in some implementations. The temperature threshold value may be different for a processing unit of the electronic device.

When the method determines (at 1010) that the temperature of the electronic device does not satisfy the temperature threshold value (e.g., temperature of the electronic device is greater than the temperature threshold value), the method proceeds to decrease (at 1025) activity of a processing unit (e.g., CPU, GPU) of the electronic device. In some implementations, decreasing the activity of the processing unit includes decreasing the clock speed or clock frequency of the processing unit. In some implementations, the activity of the processing unit is decreased until the temperature of the electronic device satisfies the temperature threshold value. For example, the activity of the processing unit may be decreased until the temperature of the electronic device is at or below the temperature threshold value (e.g., temperature of external surface portion of electronic device is at or below 45° C.).

However, when the method determines (at 1010) that the temperature of the electronic device satisfies the temperature threshold value (e.g., temperature of the electronic device is less than the temperature threshold value), the method proceeds to determine (at 1015) whether the temperature rate change of the electronic device satisfies a temperature rate change threshold value. In some implementations, the method determines whether the rate of the temperature change of the electronic device (e.g., rate of temperature change of the external surface portion of electronic device) is 0.05° C./second or less. When the temperature rate change corresponds to the processing unit, the temperature rate change threshold value may be different in some implementations.

When the method determines (at 1015) that the temperature rate change does not satisfy the temperature rate change threshold value, the method proceeds to (at 1025) to decrease the activity of a processing unit (e.g., CPU, GPU) of the electronic device. Different implementations may decrease the activity of the processing unit differently.

However, when the method determines (at 1015) that the temperature rate change satisfies the temperature rate change threshold value, the method may allow (at 1020) activity of a processing unit of the electronic device to be increased. In some implementations, the activity of the processing unit may remain the same. In some implementations, the activity of the processing unit may increase. The activity of the processing unit may increase when additional processing capability is required (e.g., when performing video processing, playing games). The activity of the processing unit may be increased until the temperature rate change no longer satisfies the temperature rate change threshold value. For example, the activity of the processing unit may increase until the temperature rate change reaches 0.05° C./second in some implementations. In some implementations, several iterations of the method of FIG. 10 may be performed.

In some implementations, the thermal management unit controls and regulates the operation and activity. In such instances, one or more of the processing units (e.g., CPU, GPU) of an electronic device may request approval or authorization from the thermal management unit before increasing activity. FIG. 11 illustrates a flow diagram of method that a thermal management unit may perform to determine whether to allow one or more processing units to increase activity in some implementations.

Figure 11:
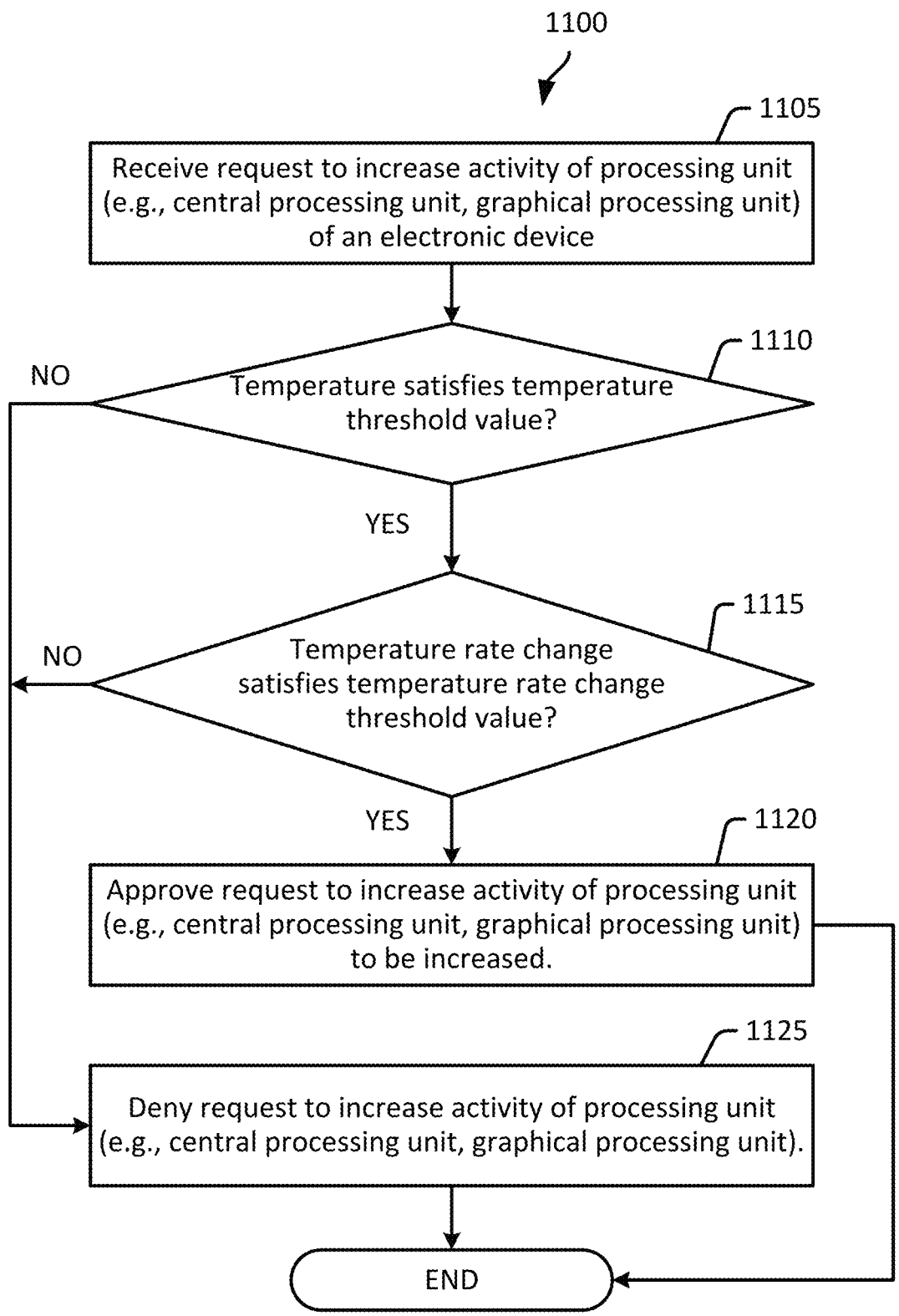
FIG. 11 illustrates a flow diagram of a method that a thermal management unit may perform to allow or deny an increase in the activity of a processing unit.

Specifically, FIG. 11 illustrates a flow diagram of a method that a thermal management unit may perform to allow or deny an increase in the activity of a processing unit in some implementations. As shown in FIG. 11, the method receives (at 1105) a request to increase the activity of a processing unit (e.g., CPU, GPU) of an electronic device. For example, the method may receive (at 1105) such a request when one or more of the processing units needs to increase its activity in response to a user performing an operation that requires more processing power (e.g., playing games, video, or opening additional applications).

Next, the method determines (at 1110) whether the temperature of the electronic device satisfies a temperature threshold value. In some implementations, determining whether the temperature satisfies the temperature threshold value includes determining the temperature of the electronic device. Determining the temperature of the electronic device may include measuring and/or estimating the temperature of the electronic device. The temperature of the electronic device may be the temperature of the processing unit in the electronic device, and/or temperature of the external surface portion of the electronic device. In some implementations, the temperature threshold value is the maximum allowed temperature for an external surface portion of the electronic device. The maximum allowed temperature for the external surface portion of the electronic device may be 45° C. in some implementations. The temperature threshold value may be different for a processing unit of the electronic device. One or more sensors (e.g., temperature sensors) may be used to measure and/or estimate the temperature and/or temperate rate change of the electronic device. These sensors may be located anywhere in and/or around the electronic device.

When the method determines (at 1110) that the temperature of the electronic device does not satisfy the temperature threshold value (e.g., temperature of the electronic device is greater than the temperature threshold value), the method proceeds to deny (at 1125) the request to increase activity of the processing unit (e.g., CPU, GPU) of the electronic device.

However, when the method determines (at 1110) that the temperature of the electronic device satisfies the temperature threshold value (e.g., temperature of the electronic device is less than the temperature threshold value), the method proceeds to determine (at 1115) whether the temperature rate change of the electronic device satisfies a temperature rate change threshold value. In some implementations, the method determines whether the rate of the temperature change of the electronic device (e.g., rate of temperature change of the external surface portion of electronic device) is 0.05° C./second or less. When the temperature rate change corresponds to the processing unit, the temperature rate change threshold value may be different in some implementations. When the method determines (at 1115) that the temperature rate change does not satisfy the temperature rate change threshold value, the method proceeds to (at 1125) to deny the request to increase the activity of a processing unit (e.g., CPU, GPU) of the electronic device.

However, when the method determines (at 1115) that the temperature rate change satisfies the temperature rate change threshold value, the method approves (at 1020) the request to increase the activity of the processing unit of the electronic device. Once the request is approved (at 1120) by the thermal management unit, the processing unit may increase its activity (e.g., increase clock speed or clock frequency). The processing unit may partially increase its activity or may increase its activity up to its full capability in some implementations. The activity of the processing unit may be increased until the temperature rate change no longer satisfies the temperature rate change threshold value or when the temperature no longer satisfies the temperature threshold value (e.g., until a maximum allowed temperature is reached). For example, the activity of the processing unit may increase until the temperature rate change reaches 0.05° C./second or until the temperature of an external surface portion of the electronic device reaches 45° C. in some implementations. In some implementations, several iterations of the method of FIG. 11 may be performed.

Exemplary Thermal Management Unit

Figure 12:
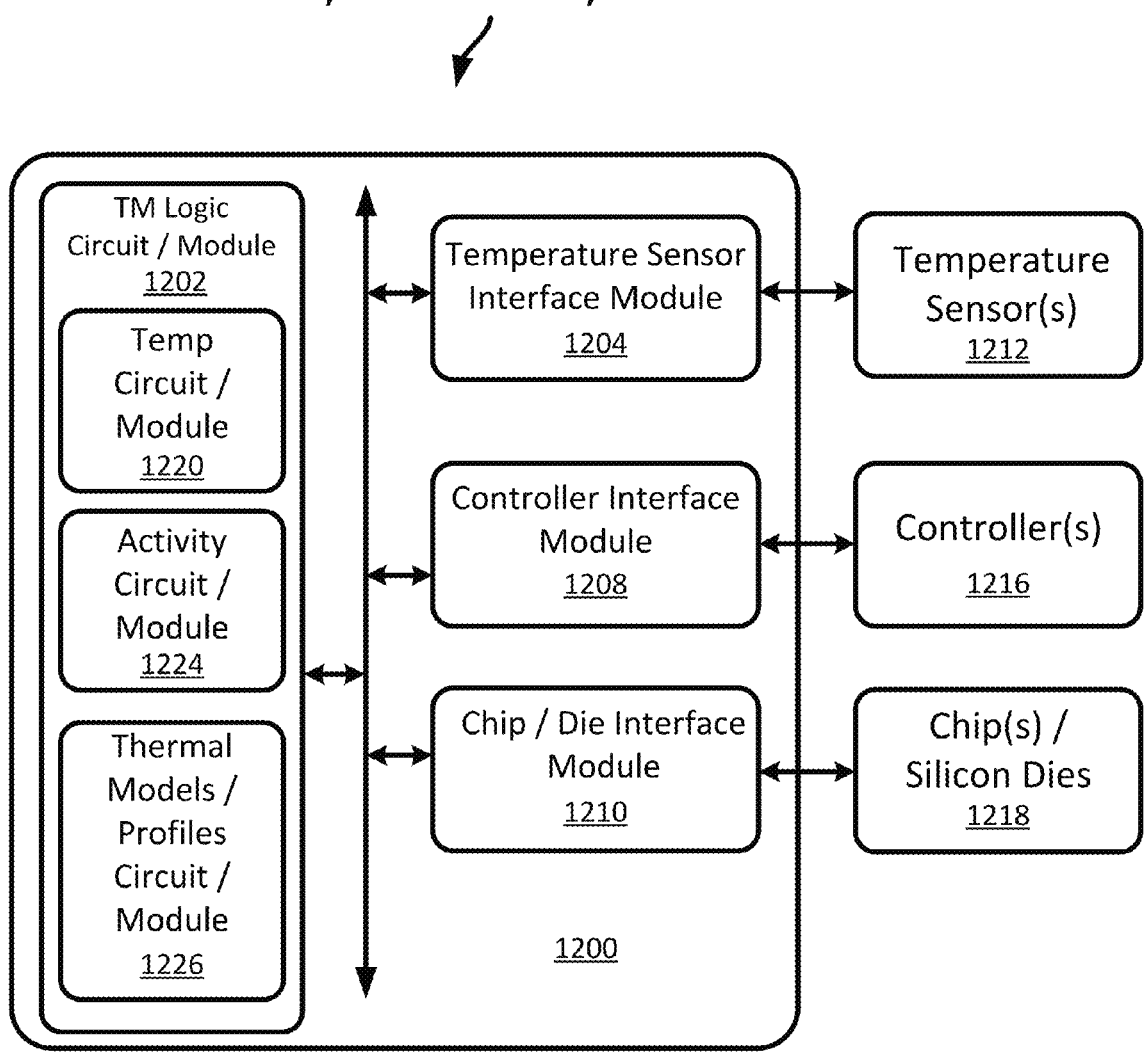
FIG. 12 illustrates a thermal management unit that may be in a die package.

In the above figures, numerous references are made to a thermal management unit. The thermal management unit may be implemented in a package in many ways. FIG. 12 conceptually illustrates a thermal management unit 1200 that may be in a die package (e.g., SiP, SoG). The thermal management unit 1200 may be a processor, a processing unit, and/or a processing circuit. For example, the thermal management unit 1200 may be part of circuit of a die (e.g., processor) or it may be its own die in the package. The thermal management unit 1200 may also be code that is stored in a computer/processor readable storage medium. The thermal management unit 1200 may also be a semiconductor device, system and/or package or part of a semiconductor device, system, and/or package distributed across several circuits and/or silicon (Si) die/dies in a package.

As shown in FIG. 12, the thermal management unit 1200 includes a thermal management (TM) logic circuit/module 1202, a temperature sensor interface module 1204, a controller interface module 1208, and a chip/die interface module 1210. The TM logic circuit/module 1202 performing the thermal management of the die and/or package, by controlling and managing the temperature and activity of the silicon die/dies in the package. The TM logic circuit/module 1202 may utilizes the techniques described above to control and manage the temperature and activity of the silicon die/dies in the package, including using thermal models, profiles and look-up tables.

The TM logic circuit/module 1202 may be coupled to the temperature sensor interface module 1204, which allows the TM logic module 1202 to receive data from temperature sensors 1212. As shown in FIG. 12, the TM logic circuit/module 1202 may further be coupled the controller interface module 1208, which allows the TM logic circuit/module 1202 to communicate back and forth with controllers 1216 (e.g., memory controller, activity controller). The TM logic circuit/module 1202 may also be coupled to the chip/die interface module 1210, which allows the TM logic circuit/module 1202 to communicate with the die/dies 1218 (e.g., silicon die). The die/dies 1218 may include a central processing unit (CPU) and/or graphical processing unit (GPU). One or more dies 1218 may be encapsulated in a die package. In some implementations, each die from the dies 1218 may be in its respective die package.

The TM logic circuit/module 1202 may also include a temperature circuit/module 1220, an activity circuit/module 1224, a thermal models/profiles circuit/module 1226. The temperature circuit/module 1220 is for analyzing temperature data. The activity circuit/module 1224 is for determining and controlling the activity of a die/dies. This includes whether to increase or decrease the activity of a die (e.g., increase or decrease activity of a CPU and/or GPU). In some implementations, the controlling of the activity of die (e.g., processor) is based on sensation values and/or discomfort levels. The thermal models/profiles circuit/module 1226 is for storing data related to thermal profiles and/or modeling of the package. The TM logic circuit/module 1202 may be a thermal sensation circuit/module (e.g., thermal sensation module 200 of FIG. 2) that includes a static sensation model, a dynamic sensation model, and/or a discomfort model. These models may be part of the temperature circuit/module 1220, activity circuit/module 1224 and/or thermal models/profiles circuit/module 1226. For example, the thermal models/profiles circuit/module 1226 may calculate/determine some or all of the sensation values (e.g., static sensation values, dynamic sensations value), and/or discomfort levels.

A temperature sensor (e.g., temperature sensor 1212) is a sensor for measuring temperature (e.g., temperature of the processing unit). The temperature sensor may be part of the die (e.g., integrated into the circuit of the die) or it can be separate from the die. The temperature sensor may be located internally or externally to the die or die package (e.g., package that includes the die).

Exemplary Electronic Devices

Figure 13:
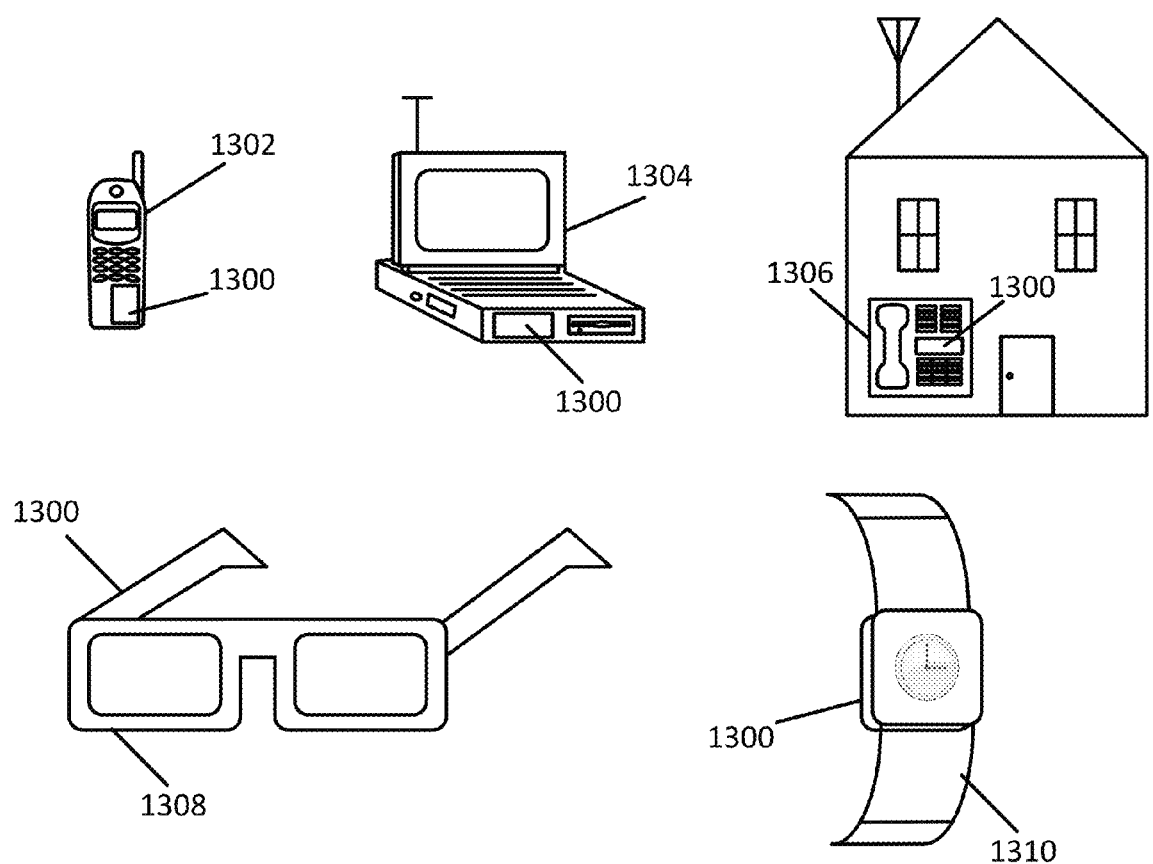
FIG. 13 illustrates various electronic devices that may be integrated with any of the aforementioned integrated circuit, die or die package.

FIG. 13 illustrates various electronic devices that may be integrated with any of the aforementioned integrated circuit, die or package. For example, a mobile telephone 1302, a laptop computer 1304, a fixed location terminal 1306, an eyeglass 1308 and a watch 1310 may include an integrated circuit (IC) 1300 as described herein. The IC 1300 may be, for example, any of the integrated circuits, dies or packages described herein. The devices 1302, 1304, 1306 illustrated in FIG. 13 are merely exemplary. Other electronic devices may also feature the IC 1300 including, but not limited to, mobile devices, hand-held personal communication systems (PCS) units, portable data units such as personal digital assistants, GPS enabled devices, navigation devices, set top boxes, music players, video players, entertainment units, fixed location data units such as meter reading equipment, communications device, smartphones, tablet computers or any other device that stores or retrieves data or computer instructions, or any combination thereof.

One or more of the components, steps, features, and/or functions illustrated in FIGS. 1, 2, 3, 4, 5, 6, 7, 8, 9, 10, 11, 12 and/or 13 may be rearranged and/or combined into a single component, step, feature or function or embodied in several components, steps, or functions. Additional elements, components, steps, and/or functions may also be added without departing from the invention.

One or more of the components, steps, features and/or functions illustrated in the FIGs may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGs may be configured to perform one or more of the methods, features, or steps described in the FIGs. The novel algorithms described herein may also be efficiently implemented in software and/or embedded in hardware.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. The term "die package" is used to refer to an integrated circuit wafer that has been encapsulated or packaged or encapsulated.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method for performing thermal management of an electronic device, comprising:
    determining a static temperature sensation value based on a device temperature of the electronic device;
    determining a dynamic temperature sensation value based on a rate of change in the device temperature;
    determining a combined temperature sensation value based a combination of the static temperature sensation value and the dynamic temperature sensation value;
    associating, based on the combined temperature sensation value, a discomfort level from a plurality of discomfort levels to the electronic device, the discomfort level specifying a maximum allowed activity for a processing unit of the electronic device; and
    controlling the processing unit based on the combined temperature sensation value and the at least one discomfort level.

2. The method of claim 1, wherein the combined temperature sensation value is based on an adjustable sensation model that includes a static sensation model and a dynamic sensation model.

3. The method of claim 2, wherein the adjustable sensation model is based on at least one thermal coefficient constant.

4. The method of claim 3, wherein at least one thermal coefficient constant is adjustable, the adjustable thermal coefficient constant specifying a range of temperature values for an adjustable discomfort level.

5. The method of claim 4, wherein the range of temperature values for the adjustable discomfort level comprises a maximum temperature, the maximum temperature based on a minimum value of one of at least a sensation value, regulation limit, and/or manufacturer limit.

6. The method of claim 1 wherein controlling the processing unit comprises:
    determining whether an activity of the processing unit satisfies the maximum allowed activity for the processing unit; and
    changing the activity of the processing unit based on whether the activity satisfies the maximum allowed activity for the processing unit.

7. The method of claim 1, wherein the processing unit is controlled to reduce a difference between a perceptible device temperature and an actual device temperature.

8. The method of claim 7 wherein controlling the processing unit comprises:
    determining a time period when the perceptible device temperature is expected to be greater than the actual device temperature; and
    controlling the processing unit to reduce the time period.

9. The method of claim 8, wherein the processing unit is controlled to minimize the time period.

10. The method of claim 7, wherein the difference between the perceptible device temperature and the actual device temperature occurs due to the rate of change in the device temperature.

11. The method of claim 1, wherein the discomfort level specifies how thermally uncomfortable an exterior surface of the electronic device is for a user of the electronic device.

12. The method of claim 1, wherein each discomfort level from the plurality of discomfort levels is associated with a particular range of combined temperature sensation values.

13. The method of claim 1, wherein the device temperature is the temperature of an exterior surface portion of the electronic device, the temperature rate change of the electronic device being the temperature rate change of the exterior surface portion of the electronic device.

14. The method of claim 1, further comprising estimating the device temperature based on a processing unit temperature of the processing unit.

15. The method of claim 1, wherein the electronic device is incorporated into at least one of a music player, a video player, an entertainment unit, a navigation device, a communications device, a mobile device, a mobile phone, a smartphone, a personal digital assistant, a fixed location terminal, a tablet computer, a laptop computer, an eyeglass, a watch and/or wearable device.

16. The method of claim 1, wherein an increase in the rate of change in the device temperature results in a greater increase in the combined temperature sensation value than would otherwise arise due to a corresponding increase in the device temperature.

17. The method of claim 1, wherein controlling the processing unit based on the combined temperature sensation value and the at least one discomfort level further exploits one or more of a user age, a user occupation, a user gender and/or a geographical region of the user.

18. An apparatus configured to perform thermal management of an electronic device, comprising:
    means for determining a static temperature sensation value based on a device temperature of the electronic device;
    means for determining a dynamic temperature sensation value based on a rate of change in the device temperature;
    means for determining a combined temperature sensation value based a combination of the static temperature sensation value and the dynamic temperature sensation value;
    means for associating based on the combined temperature sensation value, a discomfort level from a plurality of discomfort levels to the electronic device, the discomfort level specifying a maximum allowed activity for a processing unit of the electronic device; and
    means for controlling the processing unit based on the combined temperature sensation value and the at least one discomfort level.

19. The apparatus of claim 18, wherein the combined temperature sensation value is based on an adjustable sensation model that includes a static sensation model and a dynamic sensation model.

20. The apparatus of claim 19, wherein the adjustable sensation model is based on at least one thermal coefficient constant.

21. The apparatus of claim 20, wherein at least one thermal coefficient constant is adjustable, the adjustable thermal coefficient constant specifying a range of temperature values for an adjustable discomfort level.

22. The apparatus of claim 21, wherein the range of temperature values for the adjustable discomfort level comprises a maximum temperature, the maximum temperature based on a minimum value of one of at least a sensation value, regulation limit, and/or manufacturer limit.

23. The apparatus of claim 18, wherein the device temperature is the temperature of an exterior surface portion of the electronic device, the temperature rate change of the electronic device being the temperature rate change of the exterior surface portion of the electronic device.

24. The apparatus of claim 18, wherein the apparatus is incorporated into at least one of a music player, a video player, an entertainment unit, a navigation device, a communications device, a mobile device, a mobile phone, a smartphone, a personal digital assistant, a fixed location terminal, a tablet computer, a laptop computer, an eyeglass, a watch and/or wearable device.

25. The apparatus of claim 18, wherein an increase in the rate of change in the device temperature results in a greater increase in the combined temperature sensation value than would otherwise arise due to a corresponding increase in the device temperature.

26. A non-transitory computer readable storage medium comprising one or more instructions for performing thermal management of an electronic device, which when executed by at least one processor, causes the at least one processor to:
    determining a static temperature sensation value based on a device temperature of the electronic device;
    determining a dynamic temperature sensation value based on a rate of change in the device temperature;
    determining a combined temperature sensation value based a combination of the static temperature sensation value and the dynamic temperature sensation value;
    associate based on the combined temperature sensation value, a discomfort level from a plurality of discomfort levels to the electronic device, the discomfort level specifying a maximum allowed activity for a processing unit of the electronic device; and
    control the processing unit based on the combined temperature sensation value and the at least one discomfort level.

27. The non-transitory computer readable storage medium of claim 26, wherein the combined temperature sensation value is based on an adjustable sensation model that includes a static sensation model and a dynamic sensation model.

28. The non-transitory computer readable storage medium of claim 27, wherein the adjustable sensation model is based on at least one thermal coefficient constant.

29. The non-transitory computer readable storage medium of claim 28, wherein at least one thermal coefficient constant is adjustable, the adjustable thermal coefficient constant specifying a range of temperature values for an adjustable discomfort level.

30. The non-transitory computer readable storage medium of claim 29, wherein the range of temperature values for the adjustable discomfort level comprises a maximum temperature, the maximum temperature based on a minimum value of one of at least a sensation value, regulation limit, and/or manufacturer limit.

31. The non-transitory computer readable storage medium of claim 26 further comprising one or more instructions, which when executed by the at least one processor, causes the at least one processor to:
    determine whether an activity of the processing unit satisfies the maximum allowed activity for the processing unit; and
    change the activity of the processing unit based on whether the activity satisfies the maximum allowed activity for the processing unit.

32. The non-transitory computer readable storage medium of claim 26, wherein the one or more instructions, which when executed by the at least one processor, causes the at least one processor to reduce the difference between a perceptible device temperature and an actual device temperature.

33. The non-transitory computer readable storage medium of claim 32 further comprising one or more instructions, which when executed by the at least one processor, causes the at least one processor to:

determine a time period when the perceptible device temperature is expected to be greater than the actual device temperature; and control the processing unit to reduce the time period.

34. The non-transitory computer readable storage medium of claim 33, wherein the one or more instructions, which when executed by the at least one processor, causes the at least one processor to minimize the time period.

35. The non-transitory computer readable storage medium of claim 32, wherein the difference between the perceptible device temperature and the actual device temperature occurs due to the rate of change in the device temperature.

36. The non-transitory computer readable storage medium of claim 26, wherein the device temperature is the temperature of an exterior surface portion of the electronic device, the temperature rate change of the electronic device being the temperature rate change of the exterior surface portion of the electronic device.

37. The non-transitory computer readable storage medium of claim 26, further including instructions for controlling the at least one processor to estimate the device temperature based on a processing unit temperature of the processing unit.

38. The non-transitory computer readable storage medium of claim 26, wherein the computer readable storage medium is incorporated into at least one of a music player, a video player, an entertainment unit, a navigation device, a communications device, a mobile device, a mobile phone, a smartphone, a personal digital assistant, a fixed location terminal, a tablet computer, a laptop computer, an eyeglass, a watch and/or wearable device.

39. The non-transitory computer readable storage medium of claim 26, wherein an increase in the rate of change in the device temperature results in a greater increase in the combined temperature sensation value than would otherwise arise due to a corresponding increase in the device temperature.

40. An electronic device comprising:
a memory configured to store one or more instructions; and
at least one processing circuit configured to:
determine a static temperature sensation value based on a device temperature of the electronic device;
determine a dynamic temperature sensation value based on a rate of change in the device temperature;
determine a combined temperature sensation value based a combination of the static temperature sensation value and the dynamic temperature sensation value;
associate based on the combined temperature sensation value, a discomfort level from a plurality of discomfort levels to the electronic device, the discomfort level specifying a maximum allowed activity for the processing circuit of the electronic device; and
control at least one processing unit of the processing circuit based on the combined temperature sensation value and the at least one discomfort level.

41. The electronic device of claim 40, wherein the combined temperature sensation value is based on an adjustable sensation model that includes a static sensation model and a dynamic sensation model.

42. The electronic device of claim 41, wherein the adjustable sensation model is based on at least one thermal coefficient constant.

43. The electronic device of claim 42, wherein at least one thermal coefficient constant is adjustable, the adjustable thermal coefficient constant specifying a range of temperature values for an adjustable discomfort level.

44. The electronic device of claim 43, wherein the range of temperature values for the adjustable discomfort level comprises a maximum temperature, the maximum temperature based on a minimum value of one of at least a sensation value, regulation limit, and/or manufacturer limit.

45. The electronic device of claim 40, wherein the at least one processing circuit is further configured to:
determine whether an activity of the processing circuit satisfies the maximum allowed activity for the processing circuit; and
change the activity of the processing circuit based on whether the activity satisfies the maximum allowed activity for the processing circuit.

46. The electronic device of claim 40, wherein the processing unit is controlled to reduce a difference between a perceptible device temperature and an actual device temperature.

47. The electronic device of claim 46, wherein the at least one processing circuit is further configured to:
determine a time period when the perceptible device temperature is expected to be greater than the actual device temperature; and
control the processing unit to reduce the time period.

48. The electronic device of claim 47, wherein the processing unit is controlled to minimize the time period.

49. The device of claim 46, wherein the difference between the perceptible device temperature and the actual device temperature occurs due to the rate of change in the device temperature.

50. The electronic device of claim 40, wherein the exterior surface of temperature is the temperature of an exterior surface portion of the electronic device, the temperature rate change of the electronic device being the temperature rate change of the exterior surface portion of the electronic device.

51. The electronic device of claim 40, wherein the at least one processor is further configured to estimate the device temperature based on a processing circuit temperature of the processing circuit.

52. The electronic device of claim 40, wherein the processing circuit is one of at least a central processing unit (CPU) and/or a graphical processing unit (GPU).

53. The electronic device of claim 40, wherein the electronic device is at least one of a music player, a video player, an entertainment unit, a navigation device, a communications device, a mobile device, a mobile phone, a smartphone, a personal digital assistant, a fixed location terminal, a tablet computer, a laptop computer, an eyeglass, a watch and/or wearable device.

54. The device of claim 40, wherein an increase in the rate of change in the device temperature results in a greater increase in the combined temperature sensation value than would otherwise arise due to a corresponding increase in the device temperature.

* * * * *